(12) United States Patent
Post

(10) Patent No.: US 9,270,204 B2
(45) Date of Patent: Feb. 23, 2016

(54) TECHNIQUE FOR ENHANCING THE POWER OUTPUT OF AN ELECTROSTATIC GENERATOR EMPLOYING PARAMETRIC RESONANCE

(71) Applicant: Lawrence Livermore National Security, LLC, Livermore, CA (US)

(72) Inventor: Richard F Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 447 days.

(21) Appl. No.: 13/917,548

(22) Filed: Jun. 13, 2013

(65) Prior Publication Data

US 2014/0368181 A1  Dec. 18, 2014

(51) Int. Cl.
H02N 1/06 (2006.01)
H02N 1/00 (2006.01)

(52) U.S. Cl.
CPC .............. *H02N 1/06* (2013.01); *H02N 1/002* (2013.01); *Y10T 307/406* (2015.04)

(58) Field of Classification Search
CPC .............. H02N 1/00; H02N 1/06; H02N 1/08
USPC .......................................... 322/2 A; 310/309
See application file for complete search history.

(56) References Cited

U.S. PATENT DOCUMENTS

| | | | |
|---|---|---|---|
| 2,194,839 A | 3/1940 | Van De Graaff et al. | |
| 2,247,783 A | 7/1941 | Massolle | |
| 2,523,689 A | 9/1950 | Felici | |
| 2,567,373 A * | 9/1951 | Giacoletto | H02N 1/08 307/110 |
| 2,781,460 A | 2/1957 | Felici | |
| 2,785,320 A | 3/1957 | Morel | |
| 2,818,513 A | 12/1957 | Felici et al. | |
| 2,840,729 A | 6/1958 | Kreuthmeir | |
| 2,860,264 A | 11/1958 | Felici et al. | |
| 3,094,653 A | 6/1963 | Le May et al. | |
| 3,210,643 A | 10/1965 | Else et al. | |
| 3,629,624 A | 12/1971 | Staudte | |
| 3,951,000 A | 4/1976 | Ferriss et al. | |
| 4,126,822 A | 11/1978 | Wahlstrom | |

(Continued)

FOREIGN PATENT DOCUMENTS

JP  63-136982  6/1988

OTHER PUBLICATIONS

Trump, "Electrostatic Sources of Electric Power," Electrical Engineering, pp. 525-534, (1947).

*Primary Examiner* — Burton Mullins
(74) *Attorney, Agent, or Firm* — John P. Wooldridge

(57) ABSTRACT

A circuit-based technique enhances the power output of electrostatic generators employing an array of axially oriented rods or tubes or azimuthal corrugated metal surfaces for their electrodes. During generator operation, the peak voltage across the electrodes occurs at an azimuthal position that is intermediate between the position of minimum gap and maximum gap. If this position is also close to the azimuthal angle where the rate of change of capacity is a maximum, then the highest rf power output possible for a given maximum allowable voltage at the minimum gap can be attained. This rf power output is then coupled to the generator load through a coupling condenser that prevents suppression of the dc charging potential by conduction through the load. Optimized circuit values produce phase shifts in the rf output voltage that allow higher power output to occur at the same voltage limit at the minimum gap position.

36 Claims, 21 Drawing Sheets

(56) References Cited

U.S. PATENT DOCUMENTS

| | | |
|---|---|---|
| 4,225,801 A | 9/1980 | Parker, Jr. |
| 4,546,292 A | 10/1985 | Audren et al. |
| 4,595,852 A | 6/1986 | Gundlach |
| 4,622,510 A | 11/1986 | Cap |
| 4,754,185 A | 6/1988 | Gabriel et al. |
| 4,789,802 A | 12/1988 | Miyake |
| 4,897,592 A | 1/1990 | Hyde |
| 5,237,234 A | 8/1993 | Jebens et al. |
| 5,248,930 A | 9/1993 | Taylor |
| 5,506,491 A | 4/1996 | Ford |
| 5,705,902 A | 1/1998 | Merritt et al. |
| 5,808,383 A | 9/1998 | Kostov et al. |
| 5,965,968 A | 10/1999 | Robert et al. |
| 6,353,276 B1 | 3/2002 | Gendron |
| 6,771,002 B2 | 8/2004 | Jones |
| 6,858,962 B2 | 2/2005 | Post |
| 6,906,446 B2 | 6/2005 | Post |
| 7,230,364 B2 | 6/2007 | Odaka et al. |
| 7,834,513 B2 | 11/2010 | Post |
| 8,264,121 B2 | 9/2012 | Post |
| 8,643,249 B2 | 2/2014 | Post |
| 2006/0214535 A1 | 9/2006 | Salmon |
| 2009/0066298 A1 | 3/2009 | Post |

\* cited by examiner

TECHNIQUE FOR ENHANCING THE POWER OUTPUT OF AN ELECTROSTATIC GENERATOR EMPLOYING PARAMETRIC RESONANCE

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to electrostatic generators, and more specifically, it relates to methods for enhancing the power output and lowering the output voltage of an electrostatic generator.

2. Description of Related Art

The "New Generation" electromechanical batteries (EMBs) now under development at Lawrence Livermore National Laboratory (LLNL) employ electrostatic generator/motors with a novel geometry. This document describes a design technique for the discharging circuits of those EMBs that can enhance their generator power output substantially over that achievable using conventional circuit design criteria.

The electrostatic generator/motors of our EMBs will employ stator and rotor condenser elements that consist of longitudinal arrays of metal tubes or rods (or azimuthally corrugated metal surfaces). Such condenser elements are described in U.S. patent application Ser. No. 13/96,678, titled "An Improved Electrode Geometry for Electrostatic Generators and Motors" filed Mar. 12, 2013, which is incorporated herein by reference. A schematic end-view of a portion of the stator and rotor of such an array when it is formed of metal tubes is shown in FIG. 1. Also shown in the figure is a section of a more conventional rotor/stator array involving parallel-plane electrodes with rounded edges. More specifically, four metal tubes of the rotor are shown on the left side of the figure. Reference number 10 refers to one such rotor tube. In the figure, each of the rotor tubes is shown to be aligned in the position of maximum capacity with a metal tube of the stator. Reference number 12 refers to one such stator tube. The right side of the figure shows four metal parallel-plane electrodes of the rotor, where each electrode is azimuthally aligned with a metal parallel-plane electrode of the stator. Reference number 14 is directed to one of the rotor electrodes and reference number 16 is directed to one of the stator electrodes. The figure is intended to illustrate a one-eighth section of each of the two different configurations. Thus, the actual embodiment of the tube type geometry would have axially oriented tubes spanning around the stator and the rotor with the given spacing. The same principle applies to the metal parallel-plane stator and rotor geometry.

Among the reasons for selecting the tube-tube geometry instead of parallel-plate geometry is the fact that its voltage-breakdown limit at a given gap is substantially enhanced over that of parallel-plate electrodes having the same gap. Furthermore, the tube-tube configuration has an important additional favorable characteristic that arises from its geometry, as follows: As the rotor elements move azimuthally away from the position of maximum capacity, the gap between the rotor and stator tubes increases monotonically until it reaches its maximum value when the rotor tubes are located midway azimuthally between two azimuthally adjacent stator tubes. As a consequence, the breakdown voltage, which always increases with increasing gap, also increases monotonically with rotation until the moving tubes reach a position corresponding to the maximum gap. As examination of FIG. 1 will show, this property (of a monotonically increasing gap under rotation) is not shared by the parallel-plate geometry, where the minimum gap initially actually decreases under rotation (because of its geometry) even though the inter-electrode capacity is decreasing.

SUMMARY OF THE INVENTION

This invention addresses a novel circuit-based technique for enhancing the power output of electrostatic generators that employ an array of axially oriented rods or tubes or azimuthal corrugated metal surfaces for their electrodes. These configurations have two advantageous properties relative to the alternative "parallel-plate" geometry, one that employs longitudinally oriented flat metal plates with rounded edges for the stator and rotor electrodes. The first advantage is that this geometry has been shown to be superior in its voltage breakdown limit at the maximum capacity (minimum gap) position relative to the parallel-plate geometry. The second advantage is that this geometry has the property that the stator-rotor gap increases monotonically with rotation from the position of maximum capacity (minimum gap), whereas that is not the case for the parallel-plate geometry, where the minimum gap initially decreases with rotation owing to geometric effects. The new circuit design technique takes advantage of the fact that in the operation of the generator, the peak voltage across the electrodes occurs at an azimuthal position that is intermediate between the position of minimum gap and maximum gap. If this position is also close to the azimuthal angle where the rate of change of capacity is a maximum, then the highest rf power output possible for a given maximum allowable voltage at the minimum gap can be attained. This rf power output is then coupled to the generator load through a coupling condenser that prevents suppression of the dc charging potential by conduction through the load. The conventional design criterion for this coupling condenser is that it should be large enough to have an rf impedance that is small compared to the load impedance. The present invention shows is that, contrary to the conventional design criterion for the coupling condensers, optimized smaller values should be chosen, causing phase shifts in the rf output voltage that allow higher power output to occur at the same voltage limit at the minimum gap position. It is shown that these power gains can be quite large, approaching an order of magnitude in typical cases.

The use of parametric resonance in an electrostatic generator enhances the power output of the generator over that is possible with a simple resistive charging circuit of the type used by Trump in his studies of such generators. The fact that there is enhancement of the power output associated with the circuitry that provides the charging voltage and that extracts the power from the generator implies that optimization of the parameters to achieve particular goals is possible. These goals depend on the function that the generator is to perform, i.e., whether it is to be operated at constant speed, as in the case of power-plant generators, or at variable speed, as, for example, when the generator is a component of a flywheel energy storage module. From a practical standpoint the optimization process itself would best be accomplished by the use of a computer-simulation code based on the circuit to be optimized. Alternatively, it could be accomplished by varying the circuit parameters of a prototype model of the generator.

In either of the above cases the first step in the process is to size the inductor of each of the parametric resonance circuits in the balanced circuits that are associated with the two different embodiments of this invention so that the resonance frequency of the series circuit composed of the inductors and the condensers of the electrostatic generator lies within the band of resonance frequencies corresponding to the maximum and minimum values of those time-varying capacitors. In a fixed-frequency embodiment, these inductance values need not vary. In a variable-frequency application, the value of these inductances can change as the frequency varies. Such change can be accomplished technically in various ways, e.g., by switching in (or out) incremental-value inductors.

First consider the optimization of the circuit parameters for the case of constant-frequency operation. For this case the only concern is to maximize the power output subject to the voltage holding limitation of the inter-electrode gap of the generator electrodes. For the case of the tubular or corrugated-surface electrodes described herein, the breakdown voltage has its lowest value at minimum gap (maximum capacity). This value is therefore to be chosen to satisfy a given safety factor and then maintained at that value during the optimization of the circuit parameters. We describe below how the optimization process could be implemented using a computer-simulation code.

In both circuits described in previous paragraphs the optimization depends on the effect on the phase of the voltage waveform of changing a circuit parameter. In the shunt-load case this parameter is the value of the series coupling condensers between the generator capacitors and the load. In the series-load case it is the value of the inductance shunting the load.

For the shunt-load case the optimization would be accomplished by starting, e.g., with a value of the load resistance having a value comparable to the average value of the capacitive reactance of the generator, and then varying the value of the series coupling condensers (starting with a value high enough that the power output is insensitive to its value). As the coupling capacitor value is decreased, holding the minimum-gap voltage constant by varying the charging voltage, the phase of the voltage waveform will shift the peak voltage farther and farther from the phase of maximum capacity. This phase shift will be accompanied by an increase in the electrode-electrode gap. At some point the peak voltage may exceed the predicted breakdown voltage at that gap. One will then increase the coupling capacity incrementally until the desired voltage-breakdown safety factor is met. This point will define the optimum value of the coupling condensers for the value of load resistor chosen. The final optimum values of both the series condenser and the load resistor can then be obtained by varying the load resistor and repeating the process described above in which the coupling condensers are varied. At the end of the process, then, the optimum values of both the coupling condensers and the load resistance will have been defined.

For the series-load case the optimization process would follow essentially the same path. That is, one would start with picking load resistance values that are comparable to the average impedance of the series resonant circuit made up of the charging inductances in series with the generator capacitors. Then one would pick shunt inductance values with a reactive impedance that is large compared to the chosen value of the load resistance. Then the shunt inductance value would be decreased to find the optimum value for the chosen load impedance. Again, that process would be iterated to find the optimum value.

For the case of variable-frequency the optimization process would be essentially the same as that for the fixed frequency case, except now, as has been illustrated in this application in both the shunt-load and series load cases the variation of phase is frequency dependent. Therefore, depending on the need this variation could be employed to reduce the fall-off of the power output that accompanies the drop in frequency (as in the case of flywheel energy-storage modules). Applying the same general procedures as those described above one could find optimum values of the coupling condensers or the shunt inductances.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Voltage Breakdown Characteristics of the Rod-Rod Configuration

The new charging circuit design criteria that are to be described below depends on the quantitative voltage breakdown characteristics of a rod-rod electrode system in order to achieve optimal performance. There exist published data[1] on the breakdown voltages of well conditioned rod-rod systems fabricated from various metals. In what follows we will be using the published data curves for 303 stainless steel rods, extrapolated analytically to higher potentials than those investigated, in order to obtain quantitative values for the generator power outputs of the optimized circuits. In so doing we are making two critical assumptions. The first assumption is that the analytic extrapolation of the published data to higher values is consistent with the observed similar power-law behavior seen in many experiments. The second assumption is that the conditioning process used by the authors of the paper, namely spark conditioning, or else other techniques, such as glow-discharge conditioning, will be adequate for conditioning the multi-rod assembly of the electrostatic generator. Our results will then be based on employing the extrapolated data curves, with appropriate safety factors, to perform the calculations.

Figure 1:
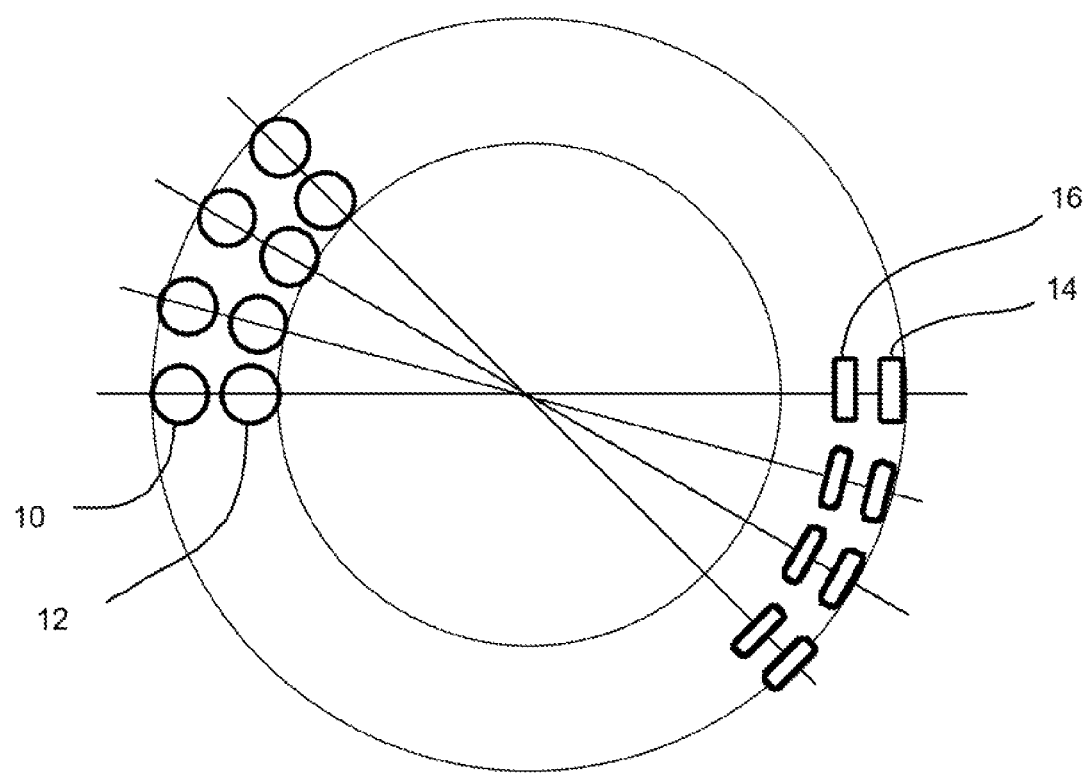
FIG. 1 is a schematic representation of rod-rod rotor and stator elements as compared to parallel-plate rotor and stator elements.
Figure 2:
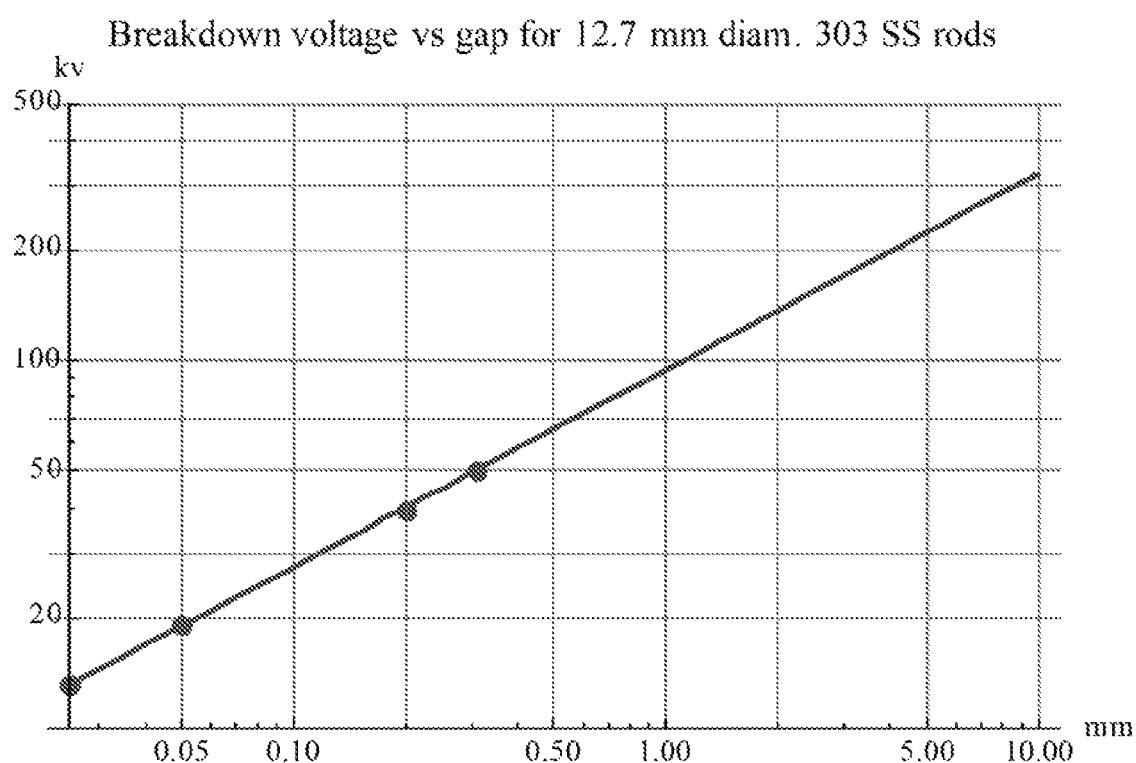
FIG. 2 is an analytic extrapolation of voltage breakdown data for 12.7 mm diameter conditioned 303 stainless steel rods.
Figure 3:
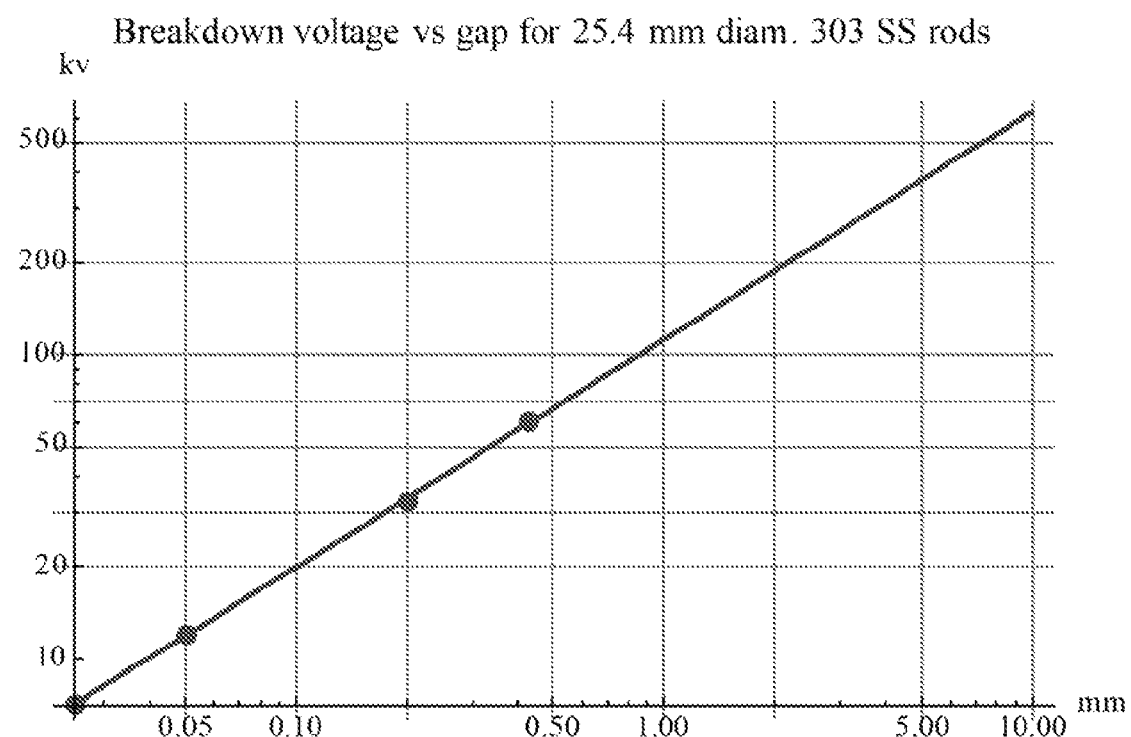
FIG. 3 is an analytic extrapolation of voltage breakdown data for 25.4 mm diameter conditioned 303 stainless steel rods.

FIGS. 2 and 3 are the breakdown voltage vs gap plots we will use to perform the calculations. FIG. 2 plots the results for 12.7 mm. diameter 303 stainless-steel rods, and FIG. 3 plots the same data for 25.4 mm. diameter 303 stainless steel rods. Shown on both plots are experimental data points together with an analytic fit of the form shown in Equation 1 below.

$$Vb = m(g)^n \text{ kilovolts} \quad [1]$$

Here Vb is the breakdown voltage, g (meters) is the gap, and m and n are coefficients determined analytically from the data points.

Description of the Rotor-Stator Geometry and the Charging Circuits and Load Circuits For electrically related reasons the rotor-stator configuration of our EMBs has a rotor formed by an assembly of rods (or tubes, or corrugated protuberances) that runs nearly the entire length of the inside surface of the flywheel rotor. The stator, however, is separated at the middle of the rotor assembly into an upper and a lower section. See FIG. 6C and FIG. 11A and their associated discussions in the incorporated patent application. Referring to the circuit drawing of FIG. 4, the upper and lower stator sections are connected to the charging inductors of identical circuits, the charging supplies of which are the same in output voltage but opposite in polarity. In this circumstance, the rotor rod assembly operates at virtual "ground" potential. That is, the balanced nature of the complete charging circuit assures that the potential of the rotor assembly remains close to zero during operation (within the precision to which the charging voltages, the circuit elements, and the geometrical gaps, are held). Using this form of charging circuit, the "grounding" brushes for the rotor electrodes that were needed by Trump at M. I. T. in his electrostatic generator, one that used a single resistive charging circuit, are not required.

Figure 4:
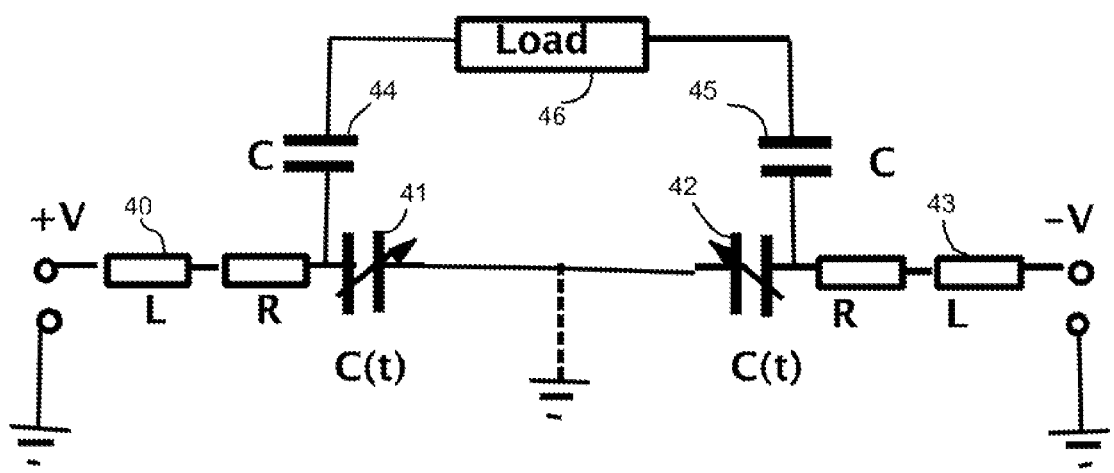
FIG. 4 is a schematic drawing of dual balanced parametric resonance charging circuits, L and R; stator and rotor of the generator electrodes, C(t); coupling condensers, C; and resistive load.

The circuit of FIG. 4 includes a source of positive dc voltage connected to a first inductor 40 which is connected to a first variable capacitor (VC) 41 which is connected to a second VC 42 which is connected to a second inductor 43 which is connected to a source of negative dc voltage. The first and second VC are synchronously monotonically variable between a maximum gap and a minimum gap. The first inductor in series with the first VC forms a first series-resonant circuit and the second inductor in series with the second VC forms a second series-resonant circuit. Each of the first series-resonant circuit and the second series-resonant circuit are configured to comprise a resonant frequency that varies over a band of frequencies that includes the operating frequency of the first VC and the second VC. A first coupling capacitor (CC) 44 is connected to a node between the first inductor and the first VC and a second CC 45 is connected to a node between the second inductor and the second VC. A load 46 is connected between the first CC and the second CC.

In the present charging circuits, the values of the external circuit elements, i.e., the charging inductors and the condensers that couple the ac component of the output of the generator to the load, will be chosen so as to optimize the generator performance as well as to permit the achievement of the desired output power level. The novelty of the optimization process described herein is that important elements of it are counter-intuitive to conventional approaches to choosing the values of some of the components. For example, a target voltage is determined at the minimum gap, where the target voltage is a specific voltage that is less than the breakdown voltage at the minimum gap. The target voltage at the minimum gap is maintained while the value of the first CC and the second CC are synchronously adjusted to move the peak phase of the generated voltage to a new position to produce an increased allowable voltage due to an increased breakdown voltage at the new position relative to the allowable voltage at the new position prior to the step of adjusting the value of the first CC and the second CC.

Mechanism of the Conversion of Rotational Energy to Electrical Energy by an Electrostatic Generator In order to understand the principles behind the new optimization process for the generation of electrical energy by an electrostatic generator the rotor of which is attached to a spinning flywheel, it is necessary to start with the basic equation describing the relationship between the charge on a time-varying capacitor and the voltage that appears across its terminals. This relationship is given in Equation 2 below.

$$V(t) = \frac{q}{C(t)} \quad [2]$$

Here V(t) (Volts) is the voltage across the condenser, q (Coulombs) is the charge on the condenser, and C(t) (Farads) is its capacity. The rate of change of the voltage resulting from the rate of change of the capacity is given by the derivative of Equation 2 with respect to time, as shown by Equation 3, below.

$$\frac{dV(t)}{dt} = -\frac{q\left(\frac{dC}{dt}\right)}{C(t)^2} \quad [3]$$

As can be seen from the equation, if q is positive, then in order for there to be a flow of electrical energy out of the condenser (i.e., positive dV/dt), the rate of change of the capacity must be negative, i.e., the capacity must be decreasing. It follows that no electrical power is generated at those times when the rate of change of capacity is zero, e.g., when the capacity is a maximum, corresponding to the minimum gap. Since the breakdown voltage is lowest at the minimum gap (maximum capacity), our task is to limit the voltage across the condenser when it is at its maximum value (when the gap is minimum), while at the same time attempting to have the voltage maximum occur at the time when dC/dt has its maximum negative value. This time will be located approximately halfway between the time of minimum gap and that of maximum gap.

Circuit Equations for the Electrostatic Generator

The analyses described in this report have been produced by a Mathematica® code based on the Kirchoff Law circuit equations for the circuit shown in FIG. 4. The three equations that are to be solved simultaneously are given below.

$$V_0(t) - R_{ind}\frac{dq_1}{dt} - L\frac{d^2q_1}{dt^2} - \frac{q_2}{C(t)} = 0 \quad (4)$$

$$V_0(t) - R_{ind}\frac{dq_1}{dt} - L\frac{d^2q_1}{dt^2} - \frac{q_3}{C} - R_{load} = 0 \quad (5)$$

$$q_1 - q_2 - q_3 = 0 \quad (6)$$

Here $V_0(t)$ is the charging dc voltage, $R_{ind}$ (ohms) is the resistance of the charging circuit inductance, L(henrys), C(t) (farads) is the time-varying capacitance of the electrostatic generator, C(farads) is the coupling condenser, and $R_{load}$ (ohms) is the load, assumed to be purely resistive. The q's are the charges in the circuits, with dq/dt being the current. The initial condition is that all of the q values and their time derivatives are zero. In addition, to minimize starting transient effects the charging voltage starts at zero and grows smoothly and rapidly to its final value as determined by the Gaussian form given by Equation 7.

$$V_0(t) = V_0[1 - e^{-(t/t_0)^2}] \quad (7)$$

From the computer-generated solution of these equations, the time-dependent currents and voltages at any point in the circuit may be determined and plotted.

Finally, the functional form of the generator capacity, C(t), was calculated independently using a formula for the capacity between two rods given in Smythe[2]. The calculation was performed by summing the rod-rod capacity between a given stator rod and five adjacent rotor rods for plus and minus transverse displacements of the stator rod by a distance equal to the rod-rod azimuthal separation. Though the answer obtained is less accurate than the result that would be obtained from a finite-element code, the performance of the system is relatively insensitive to small changes in the capacitance values.

Generator-Mode Circuit Parameters to be Optimized

Figure 5:
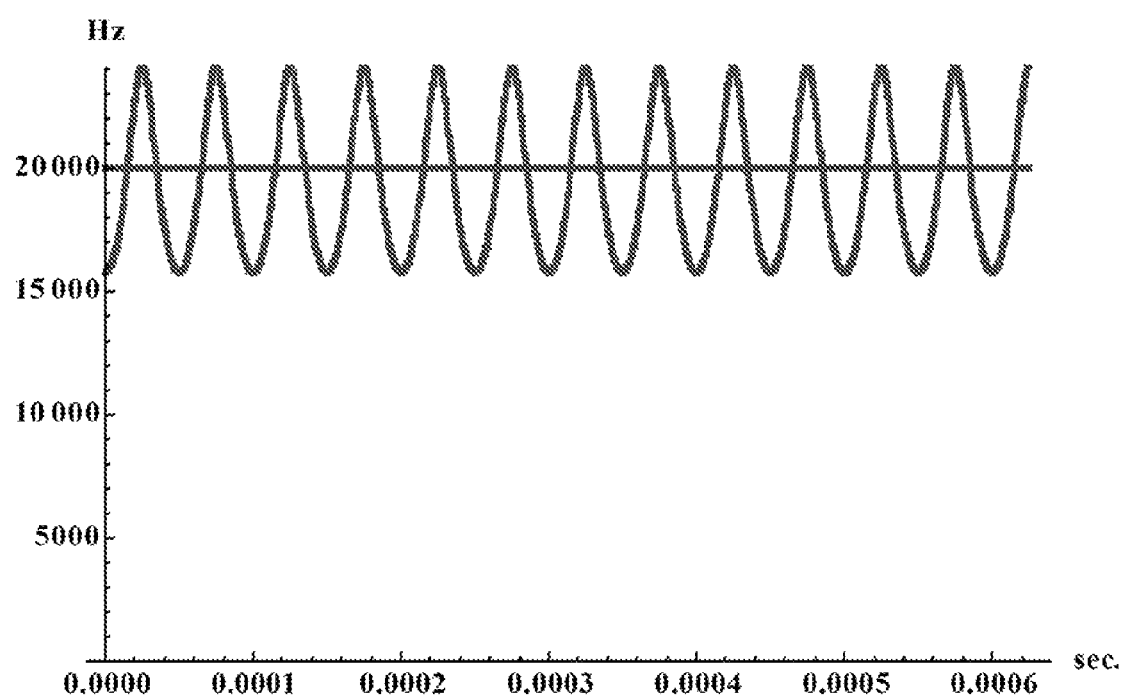
FIG. 5 shows superposed plots of operating frequency (horizontal line at 20 kHz) and of the variable resonant frequency of the circuit composed of the generator time-varying capacitor in series with the charging inductor.

Given a specific design of the rotor and stator elements of the electrostatic generator/motor configuration, the parameters of the discharge circuits that are subject to optimization consist of the following elements: The inductance and Q value of the charging inductors L(hy), the value of the coupling condensers C(farads), and the value of the load resistance, R(ohms). These values are to be determined from the output frequency and capacity value of the generator/motor time varying capacitor. The output frequency is given by the product of the rotation speed and the number of rotor rods or tubes or corrugated protuberances that are spaced around the inner surface of the rotor. To assure the output enhancement that derives from parametric resonance effects, the charging inductance must increase from an initial lower value to an upper limit value as the EMB is discharged. This tracking requirement does not require a precise match of the LC resonant frequency and the operating frequency, but only that that frequency should lie within the band of resonant frequencies arising from the time-variation of the circuit consisting of the generator/motor capacitor in series with the charging inductor. FIG. 5 illustrates the satisfaction of this requirement when the generator output frequency is 20 khz as calculated by the computer code discussed in the previous section.

There exist several technical ways to accomplish the variation of the charging inductances in order to track the operating frequency as the EMB rotor slows down during discharge. A simple way is to switch in additional series inductances as the frequency decreases. Alternatively, tuning the inductors by mechanical means, perhaps in the manner it was accomplished in early radio receivers, is a possibility. A third possibility is to use saturable reactors with control of the dc saturating currents.

Finally, there is the optimization, one that has not been examined before, of the coupling condensers that isolate the generator from discharge of the dc charging potential which they must have in order to function. Conventional wisdom would dictate simply that these condensers should be large enough so that the rf potential drop across them should be small compared to the rf output voltage of the generator. The above rationale for choosing the size of the coupling condenser is far from the optimum. As will be shown, a major improvement in performance over the conventional design can be accomplished by optimizing the value of the coupling condensers. This enhancement comes from the phase and amplitude control of the generator voltage pulses that such an optimization provides. As will be explained, the optimization process is in every case constrained by the imposition of an upper limit to the stator-rotor potential difference at the time of maximum capacity (minimum gap). This potential difference is set by applying an appropriate safety factor to the experimentally determined breakdown voltages at the minimum stator-rotor gap, as shown, for example, in FIGS. 2 and 3. For example, from FIG. 3, if the minimum gap is 2.0 mm, the indicated breakdown voltage is about 150 kV. Using, for example, a conservative "safety factor" of 3.0, the maximum allowed potential difference at the maximum capacity point would be 50 kV.

Figure 6:
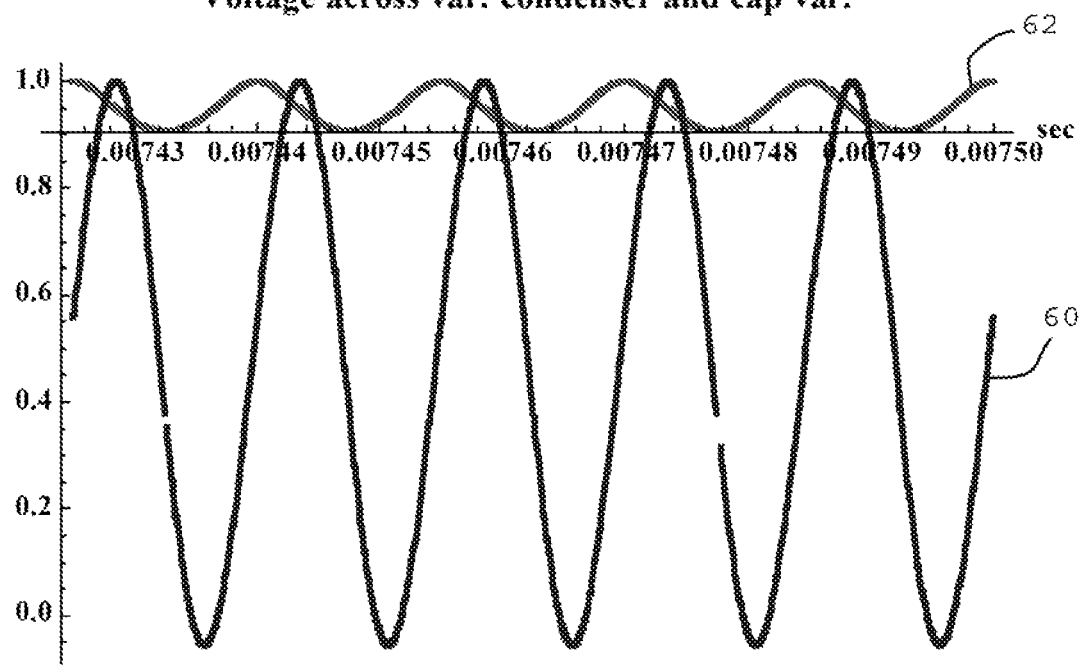
FIG. 6 shows superposed normalized plots of capacity variation and voltage across generator capacitor.

To illustrate the phase, voltage and capacity relationships that are involved (in this case for the conventional choice of the coupling capacitors), FIG. 6 represents superimposed plots of the voltage pulse 60 and the capacity variation 62, each one normalized to a maximum value of 1.0. The data are obtained from the computer code using E-S generator parameters appropriate for an EMB storing 100 kwh of kinetic energy. Specifically, the calculated maximum capacity value of each of the generator capacitors is 31.60.0 picofarads and the max/min ratio of the generator capacitors is 1.18. The "charged" rotating speed of the rotor is 21,000 rpm, and the azimuthal number of rods is 56, resulting in an rf frequency of the generator output of 19.6 khz. The rods are made of 303 stainless steel and their diameter is 25.4 mm. The projected rod-rod breakdown voltage is shown in FIG. 3.

As can readily seen the voltage across the generator capacity at the time of maximum capacity (minimum gap) is substantially less than the peak voltage, which occurs roughly midway between the maximum and minimum capacity points. Specifically, if the voltage at minimum gap is held to 50 kV, in the case shown the maximum voltage is 89.7 kV with a charging voltage of 42.4 kV. At the maximum voltage the gap has increased from 2.5 mm. to 3.6 mm for which, from FIG. 2, the predicted breakdown voltage is about 200 kV.

Figure 7:
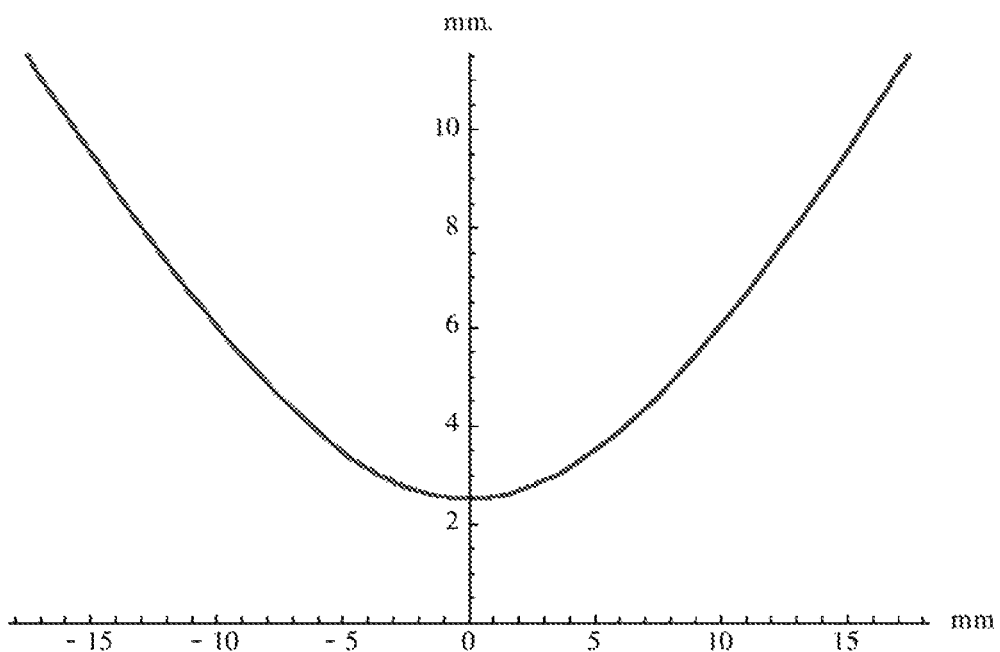
FIG. 7 is a plot of the rod-rod gap as a function of transverse displacement of a rotor rod with respect to the closest stator rod.

FIG. 7 is a plot of the gap vs lateral displacement for the rod-rod system analyzed above. It illustrates the monotonically increasing gap for this electrode geometry referred to in the Introduction.

Optimizing Generator Power Output by Sizing the Coupling Condensers

Figure 8:
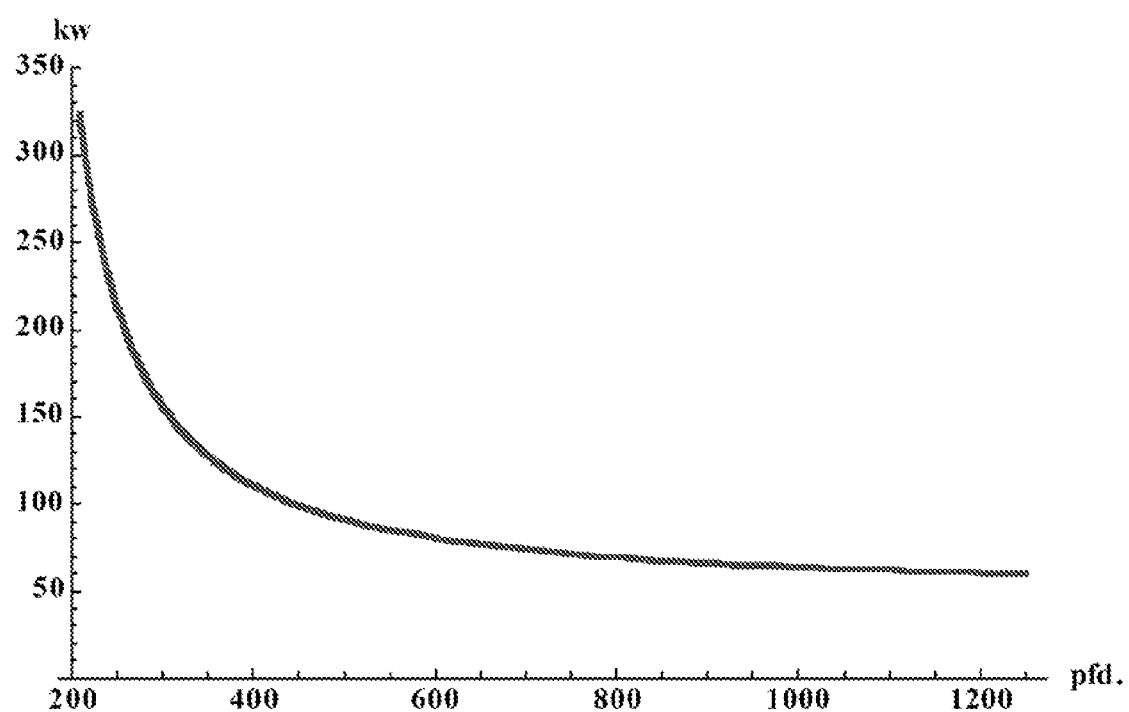
FIG. 8 is a plot of E-S generator output vs size of the coupling condensers for a generator attached to a EMB rotor storing 100 kwh.

As has been mentioned in the previous section, by resizing the coupling condensers it is possible to shift the phase of the generated pulse such that it occurs at a larger gap and at a region of larger negative derivative of the capacity, both of which lead to substantially higher power output for the same voltage limit at minimum gap. This enhancement effect is illustrated in FIG. 8 which is a plot of the power output as a function of the size of the coupling condenser. At the right end of the plot, the value of the coupling condenser is consistent with the conventional design value, i.e., it is of such a value that the drop in rf voltage across it is small compared to the rf voltage delivered by the E-S generator.

As can be seen from the plot, as the size of the coupling capacitor is reduced the power output increases, even though the output voltage at maximum capacity (i.e., at the minimum gap) is maintained at 50 kV. Note that the power increase over that obtained with the conventional choice of coupling condenser can be more than a factor of five. The origin of this increase, as has been mentioned, is the shift in phase and magnitude of the peak potential caused by choosing smaller values for the coupling condensers than those that would be used following conventional design criteria. Specifically, the phase shift causes the peak voltage location in time to be nearer to the location of the maximum time derivative of the capacitor variation, and at the same time the magnitude of the peak voltage is itself increased.

Figure 9:
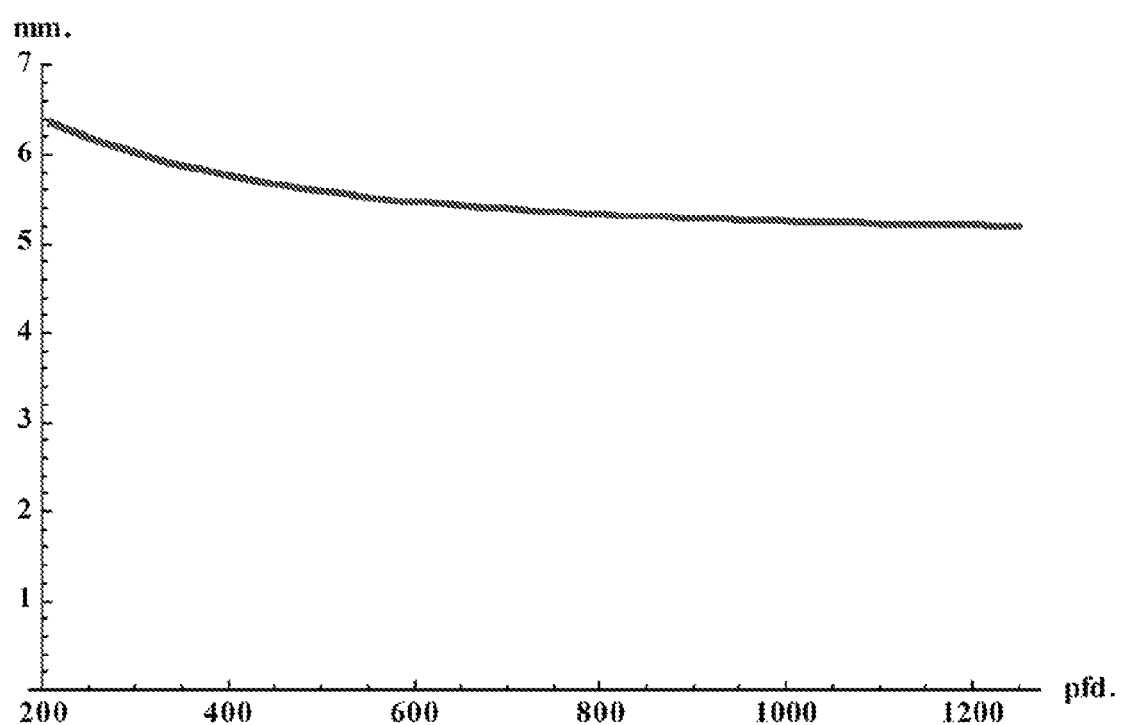
FIG. 9 is a plot of the rod-rod gap at the time of maximum voltage as a function of the coupling condenser capacitance.

As the phase shifts to lower values relative to the point of minimum gap the gap at which the maximum voltage occurs increases, thereby increasing the voltage breakdown value. This effect is shown in FIG. 9.

The increasing slope of the output power with reduction in the capacitance of the coupling condenser suggests the onset of a singularity. As the calculations show, this is not the case. If the capacitance is decreased further, the output power will grow to a maximum value and then decay rapidly toward zero.

The observed peaking effect is because of the phase shifting of the voltage pulse, coupled with the requirement that the inter-electrode voltage at the minimum gap position is constrained to be 50 kV. As the coupling capacity decreases below the lowest plotted value, the charging voltage must be increased in order to maintain the 50 kV potential at minimum gap. This increase will result in a corresponding increase in the peak rotor-stator potential until it becomes greater than the predicted rod-rod breakdown voltage shown in FIG. 3. At that point it would be necessary to reduce the charging potential so that the minimum-gap potential is below 50 kV in order to avoid voltage breakdown.

The phase-shift-induced changes in the charging voltage and the peak voltage can be deduced from the code calculations. Curve 100 of FIG. 10 illustrates the increase in charging voltage caused by lowering the coupling capacitor capacitance below the lowest capacity value plotted in FIG. 8.

Figure 10:
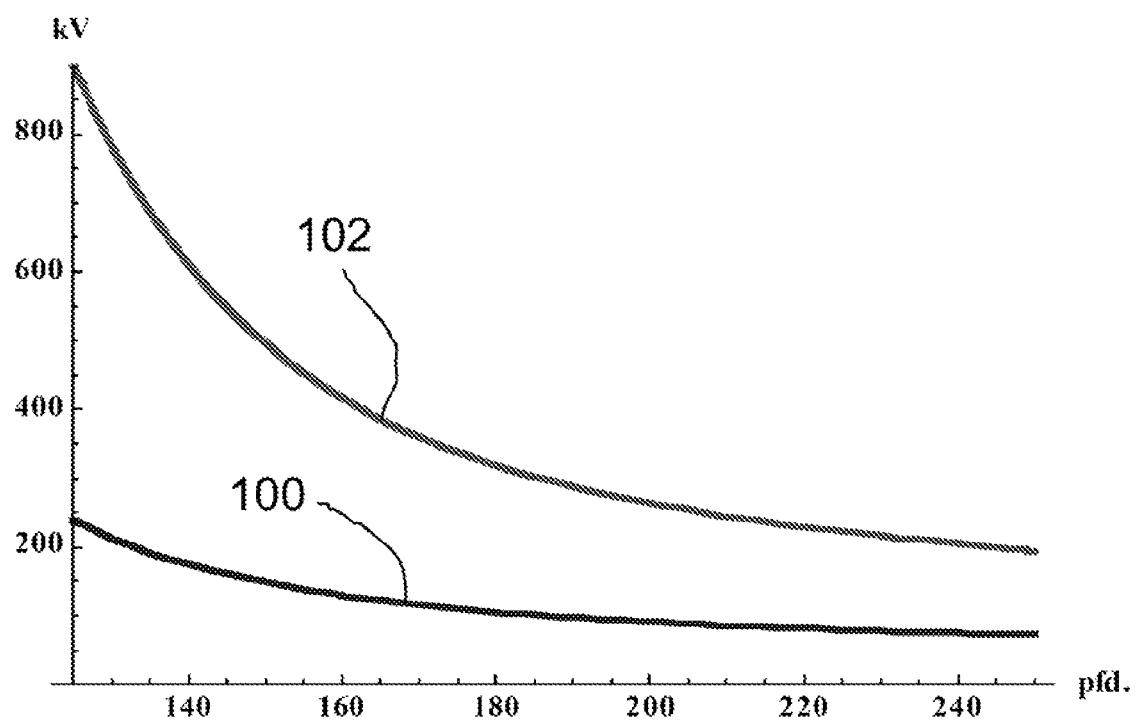
FIG. 10 shows plots of charging voltage and peak electrostatic condenser voltage as a function of the coupling capacity for small values of this capacity.

Curve 102 of FIG. 10 plots the increase in maximum voltage across the electrostatic generator capacitors as a function of the capacity of the coupling condensers.

Figure 11:
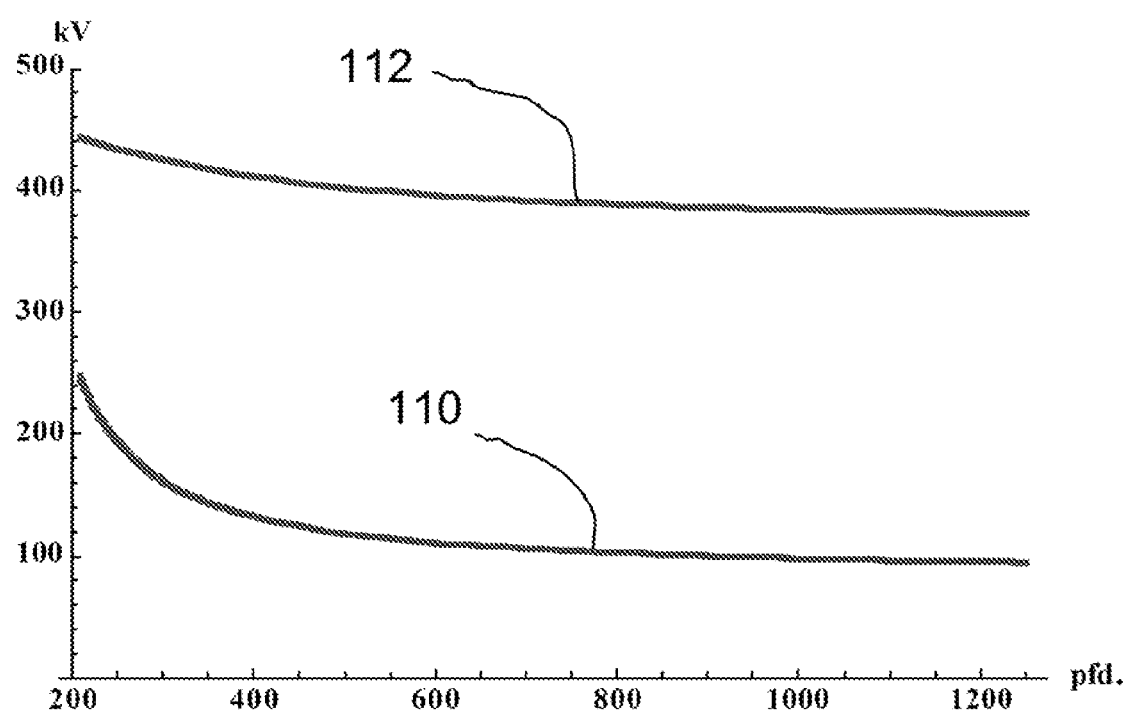
FIG. 11 shows plots of the projected breakdown voltage and the calculated peak voltage across the generator capacitors as a function of the capacity of the coupling condensers. The minimum gap potential is constrained to be 50 kV in calculating the peak voltage.

As noted above the increase in power output associated with the capacitance of the coupling condensers results from shifting the phase at which the peak voltage occurs closer to the region of maximum rate of change of capacity (see Equation 3) and from an increase in the peak voltage itself. In the example given here, these higher peak voltages are still substantially less than the extrapolated experimental breakdown voltages shown in FIG. 3. FIG. 11 below illustrates this comparison. Curve 110 is a plot of the calculated peak voltages as a function coupling capacity, and curve 112 is a plot of the projected breakdown voltages. As before, these curves depict the results obtained by the code when the voltage across the generator capacitors is limited to 50 kV at the time of minimum gap (maximum capacity).

The Load Resistance

In all of the calculations and optimizations presented in the previous sections it has been assumed that the load on the generator is a pure resistance with the value of 4.5 kOhms. This assumption has been made to simplify the discussion, but as will be discussed below this parameter is also one that needs to be optimized to achieve the highest power. In addition, the assumption of a purely ohmic resistance is unrealistic in that it is likely that in a practical situation the impedance of the load will include an inductive component. In this section we will therefore examine two effects, as follows: First, keeping the resistive component of the load impedance constant at 4.5 kOhms, we will add in an inductive reactance. As will be shown, this will have the effect of reducing the power transferred and will thus place a limit on the amount of inductive reactance that can be tolerated in a practical situation. Fortunately, keeping the inductive reactance below this limit appears to be entirely feasible. Second, we will examine the effect of varying the load resistance downward from 4.5 kOhms on the power output, finding larger values but at the same time increasing the charging voltage and the peak voltage across the generator condenser. The optimum value for the load resistance in a given situation will therefore represent a compromise between these two effects.

Figure 12:
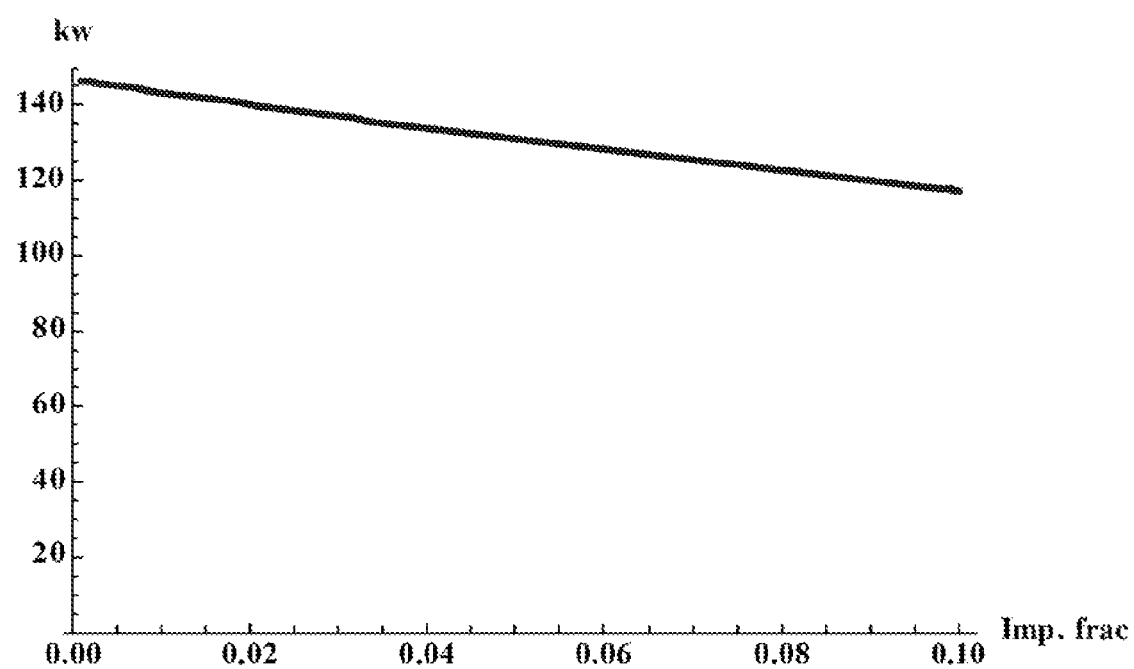
FIG. 12 shows power output as a function of the fraction of the series inductive impedance of the load resistance.
Figure 13:
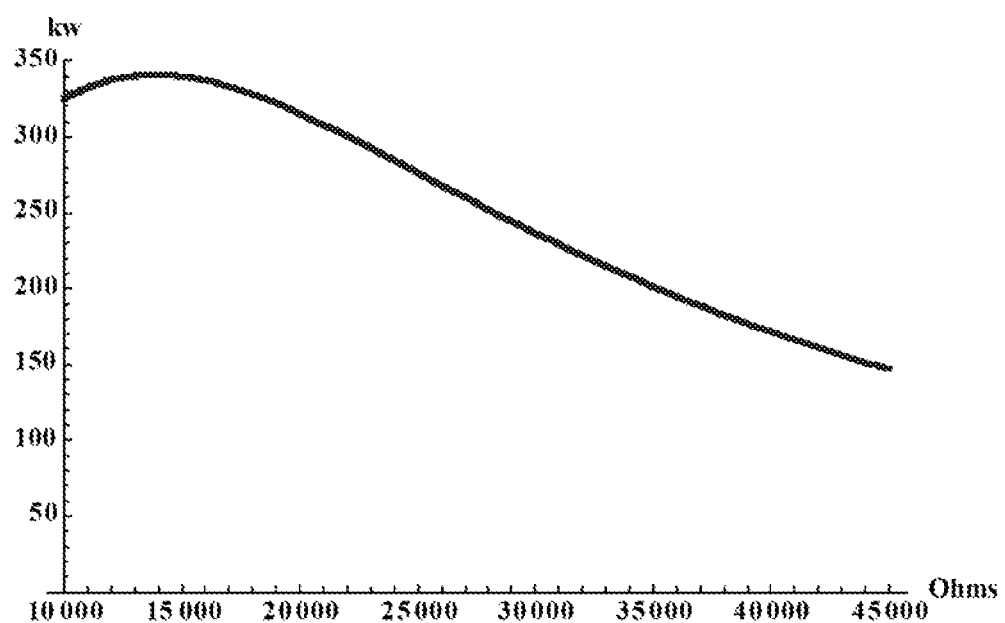
FIG. 13 shows generator power output as a function of the load resistance.

FIG. 12 shows the effect of adding a series-inductive impedance, expressed as a fraction of the load resistance of 4.5 kOhms, on the power output. As can be seen the reduction is not great provided series inductive impedance is kept below about 10 percent of the load resistance. FIG. 13 shows the power output as a function of the load resistance.

At the lower values of the load resistance the peak voltage across the generator condenser increases substantially and this effect must be taken into account to insure that the breakdown limit is not reached.

Figure 14:
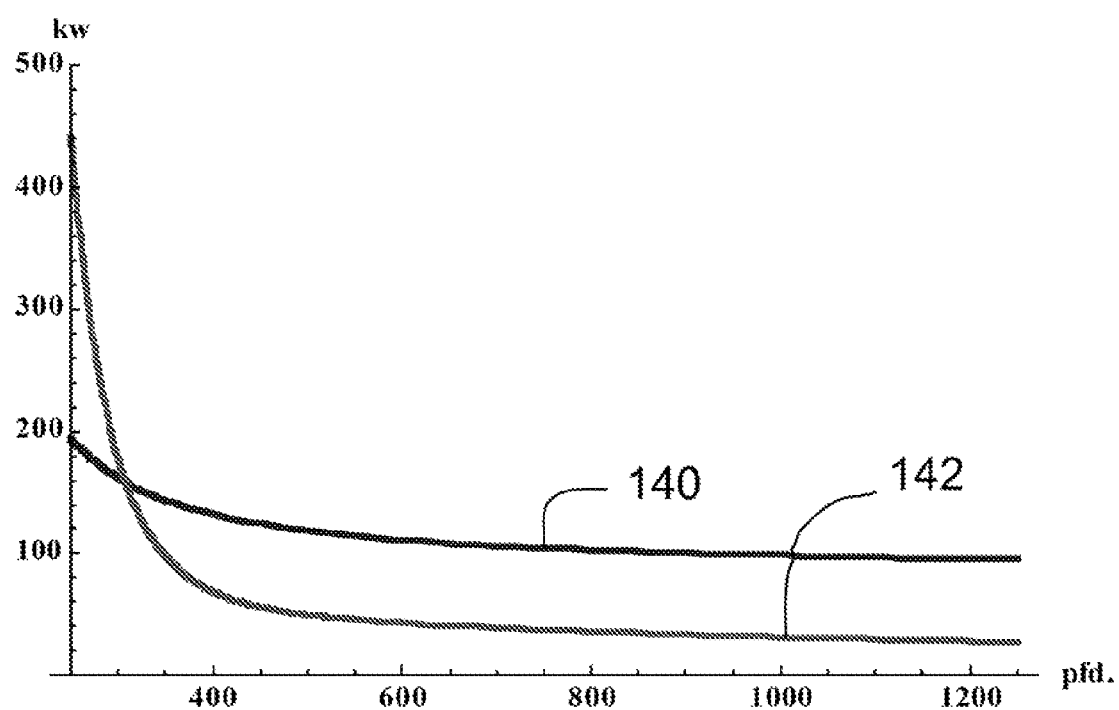
FIG. 14 shows power output as a function of coupling capacity for a rotor at full speed, and the rotor at half speed.

Reduction of the Decay of Generator Output Caused by Slowing of the Rotor Speed During Discharge The output power of the electrostatic generator using conventional design criteria for the coupling condensers always decreases substantially as the rotor slows down during discharge. This decrease can be lessened by increasing the charging voltage, subject to the voltage breakdown limits of the generator capacitors. However the analysis of the new coupling condenser design criteria has shown that the output power can remain more nearly constant with a reduction in rotor rpm (or it can even increase) when the new technique is employed. FIG. 14 below shows the result of calculating this effect. Curve 140 represents the output at full speed as a function of the coupling capacitance; curve 142 shows the power output at half-speed over the same range of coupling capacitance. In both cases the charging voltage is adjusted so that the electrostatic generator capacitor voltage at minimum gap is 50 kV.

Thus far, a novel method of enhancing the power output of an electrostatic generator has been described. The enhancement is achieved by reducing the capacity of the condensers that couple the alternating frequency output to the load below the values that would be used following conventional design criteria. This enhancement arises from the twin effects of shifting the phase at which the maximum potential across the generator condensers occurs farther from the phase where the capacity is a maximum (minimum gap position) while at the same time that potential is increased. In the example given the voltage maximum is still small compared to the projected breakdown voltages for well conditioned stainless steel rods or tubes.

Alternate Circuit Embodiment for Enhancing the Power Output of an Electrostatic Generator Employing Parametric Resonance Description of the New Load Circuits For electrically related reasons the rotor-stator configuration of our EMBs has a rotor formed by an assembly of rods (or tubes, or corrugated protuberances) that runs nearly the entire length of the inside surface of the flywheel rotor, as discussed above. The stator, however is separated at the middle of the rotor assembly into an upper and a lower section, and the upper and lower stator sections are connected to the charging inductors of identical circuits, the charging supplies of which are the same in output voltage but opposite in polarity. In this circumstance, the rotor rod assembly operates at virtual "ground" potential. That is, the balanced nature of the complete charging circuit assures that the potential of the rotor assembly remains close to zero during operation (within the precision to which the charging voltages, the circuit elements, and the geometrical gaps, are held). Using this form of charging circuit, the "grounding" brushes for the rotor electrodes that were needed by Trump at M. I. T. in his electrostatic generator, one that used a single resistive charging circuit, are not required.

Figure 15:
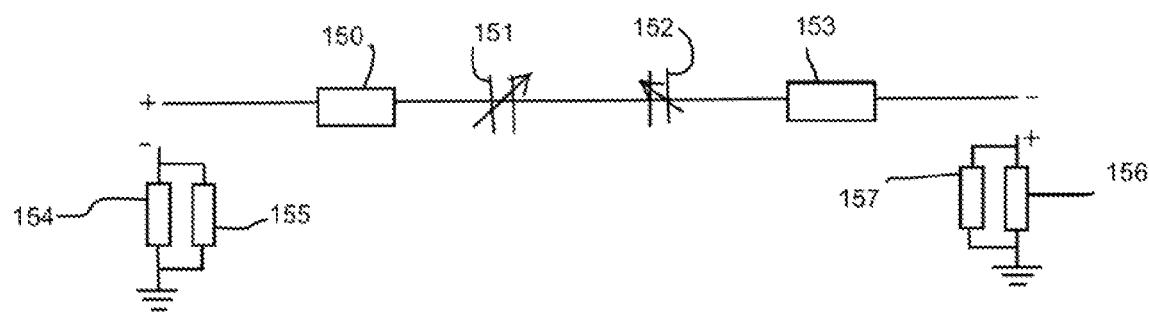
FIG. 15 is a schematic circuit drawing of one side of a balanced pair of new output circuits.

In the present circuit, the power output is not taken from the high-voltage ac generated across the E-S generator capacitors. FIG. 15 shows a schematic circuit drawing of the two circuits that form a balanced pair in the new circuit. The circuit includes a first dc voltage source having its positive terminal connected to a first inductor 150 which is connected to a first variable capacitor (VC) 151 which is connected to a second VC 152 which is connected to a second inductor 153 which is connected to the negative terminal of a second dc voltage source. The first VC and said second VC are synchronously monotonically variable between a maximum gap and a minimum gap. The first inductor in series with the first VC forms a first series-resonant circuit and the second inductor in series with the second VC forms a second series-resonant circuit. Each of the first series-resonant circuit and the second series-resonant circuit are configured to comprise a resonant frequency that varies over a band of frequencies that includes the operating frequency of the first VC and the second VC. A first load 154 is connected to the negative terminal of the first dc voltage source, and the other terminal of the first load is connected to ground. A first shunt inductor 155 is connected in parallel with the first load. A second load 156 is connected to the positive terminal of the second dc voltage source and the other terminal of the second load is connected to ground. A second shunt inductor 157 is connected in parallel with the second load.

For electrically related reasons the rotor-stator configuration of our EMBs has a rotor formed by an assembly of rods (or tubes, or corrugated protuberances) that runs nearly the entire length of the inside surface of the flywheel rotor, as discussed above. The stator, however is separated at the middle of the rotor assembly into an upper and a lower section, and the upper and lower stator sections are connected to the charging inductors of identical circuits, the charging supplies of which are the same in output voltage but opposite in polarity. In this circumstance, the rotor rod assembly operates at virtual "ground" potential.

In the new circuit the power is taken off between "ground" and the bottom end of the dc charging power supply. This simplifies the output circuits since, when the output is taken at this point, the output voltage is much lower than when the power is taken off from the E-S generator capacitor. Lowering the output voltage (to a few kilovolts compared to more than a hundred kilovolts) simplifies the problem of conversion of the high-frequency output to line frequencies. In addition there is now no need to use a coupling condenser to isolate the load from the high dc potentials present at the point where the charging inductance connects to the generator capacitor. Another, and critically important, element of the new circuit is the shunting inductance shown in the figure. This inductance, when chosen properly, has the effect of shifting the phase of the voltage waveform away from the phase corresponding to the minimum gap. In this respect it performs the same function as the series condensers performed in the circuit described above, that is, to increase the power output while holding the potential drop across the generator condenser terminals to a fixed value (50 kV in the example cases to be given).

Circuit Equations for the Electrostatic Generator

S above, the analyses described below have been produced by a Mathematica® code based on the Kirchoff Law circuit equations for the circuit shown in FIG. 15. The four equations that are to be solved simultaneously are given below.

$$-\frac{dq_2}{dt}R_{load} - \frac{d^2q_2}{dt^2}L_{load} + V_0(t) - \frac{d^2q_4}{dt^2}L_{chg} - \frac{dq_4}{dt}R_{L_{chg}} - \frac{q_4}{C(t)} = 0 \quad (2)$$

$$-\frac{d^2q_3}{dt^2}L_{shunt} - \frac{dq_3}{dt}R_{L_{shunt}} + $$
$$V_0(t) - \frac{d^2q_4}{dt^2}L_{chg} - \frac{dq_4}{dt}R_{L_{chg}} - \frac{q_4}{C(t)} = 0 \quad (3)$$

$$q_1 - q_2 - q_3 = 0 \quad (4)$$

$$q_2 - q_3 - q_4 = 0 \quad (5)$$

Here $R_{load}$ is the load resistance, $L_{load}$ is the inductive component of the load, $L_{shunt}$ (henrys) is the inductance of the shunting inductor connected across the load. The enhancement of out-put arises from the introduction of this inductor. $R_{Lshunt}$ (ohms) is the resistance of the shunting inductance, V(t) is the charging dc voltage, $R_{Lchg}$ (ohms) is the resistance of the charging circuit inductance, $L_{chg}$(henrys), and C(t) (farads) is the time-varying capacitance of the electrostatic generator. The q's are the charges in the circuits, with dq/dt being the current. The initial condition is that all of the q values and their time derivatives are zero. In addition, to minimize starting transient effects the charging voltage starts at zero and grows smoothly and rapidly to its final value as determined by the Gaussian form given by Equation 6.

$$V_0(t) = V_0[1 e^{-(t/t_0)^2}] \quad (6)$$

From the computer-generated solution of these equations the time-dependent currents and voltages at any point in the circuit may be determined and plotted.

Finally, the functional form of the generator capacity, C(t), was calculated independently using a formula for the capacity between two rods given in Smythe[2]. The calculation was performed by summing the rod-rod capacity between a given stator rod and five adjacent rotor rods for plus and minus transverse displacements of the stator rod by a distance equal to the rod-rod azimuthal separation. Though the answer obtained is less accurate than the result that would be obtained from a finite-element code, the performance of the system is relatively insensitive to small changes in the capacitance values.

Generator-Mode Circuit Parameters to be Optimized

Given a specific design of the rotor and stator elements of the electrostatic generator/motor configuration, two of the parameters of the discharge circuits that are subject of optimization are the following elements: The inductance of the charging inductors $L_{charge}$ (hy), and the value of the load resistance, $R_{load}$ (ohms). These values are to be determined taking into account the output frequency and capacity value of the generator/motor time varying capacitor. The output frequency is given by the product of the rotation speed and the number of rotor rods or tubes or corrugated protuberances that are spaced around the inner surface of the rotor. To assure the output enhancement that derives from parametric resonance effects, the charging inductance, $L_{charge}$ must increase from an initial lower value to an upper limit value as the EMB is discharged.

As described above, there exist several technical ways to accomplish the variation of the charging inductances in order to track the operating frequency as the EMB rotor slows down during discharge. A simple way is to switch in additional series inductances as the frequency decreases. Alternatively, tuning the inductors by mechanical means, perhaps in the manner it was accomplished in early radio receivers, is a possibility. A third possibility is to use saturable reactors with control of the dc saturating currents.

Figure 16:
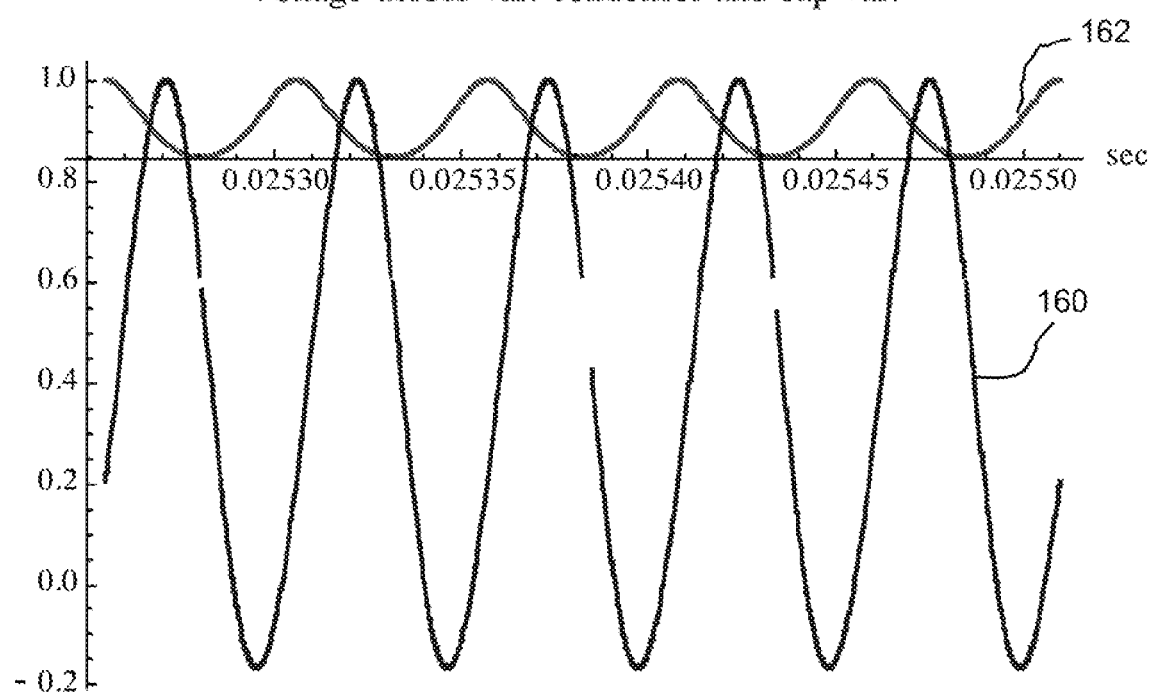
FIG. 16 shows superposed normalized plots of capacity variation and voltage across generator capacitor.

Finally, the new load circuit configuration requires the optimization of the shunting inductance so as to achieve the highest power within the range of operating speeds to be employed. When this optimum value is chosen, the phase at which the peak voltage across the generator condenser occurs will be displaced toward larger gaps that are much closer to the region of the maximum negative derivative of capacity with angle of rotation. FIG. 16 shows an example of this situation where a plot 160 of the normalized voltage variation with time is superposed on a normalized plot 162 of the capacity variation with time.

As can readily seen the voltage across the generator capacity at the time of maximum capacity (minimum gap) is substantially less than the peak voltage, which occurs roughly midway between the maximum and minimum capacity points. Specifically, when the voltage at the minimum gap of 3.0 mm is held to 50 kV, in the case shown the maximum voltage is 245 kV with a charging voltage of 98.5 kV. At the maximum voltage the gap has increased from 3.0 mm. (for which the predicted breakdown voltage is 260 kV) to 6.5 mm for which, from FIG. 2, the predicted breakdown voltage is about 480 kV.

Figure 17:
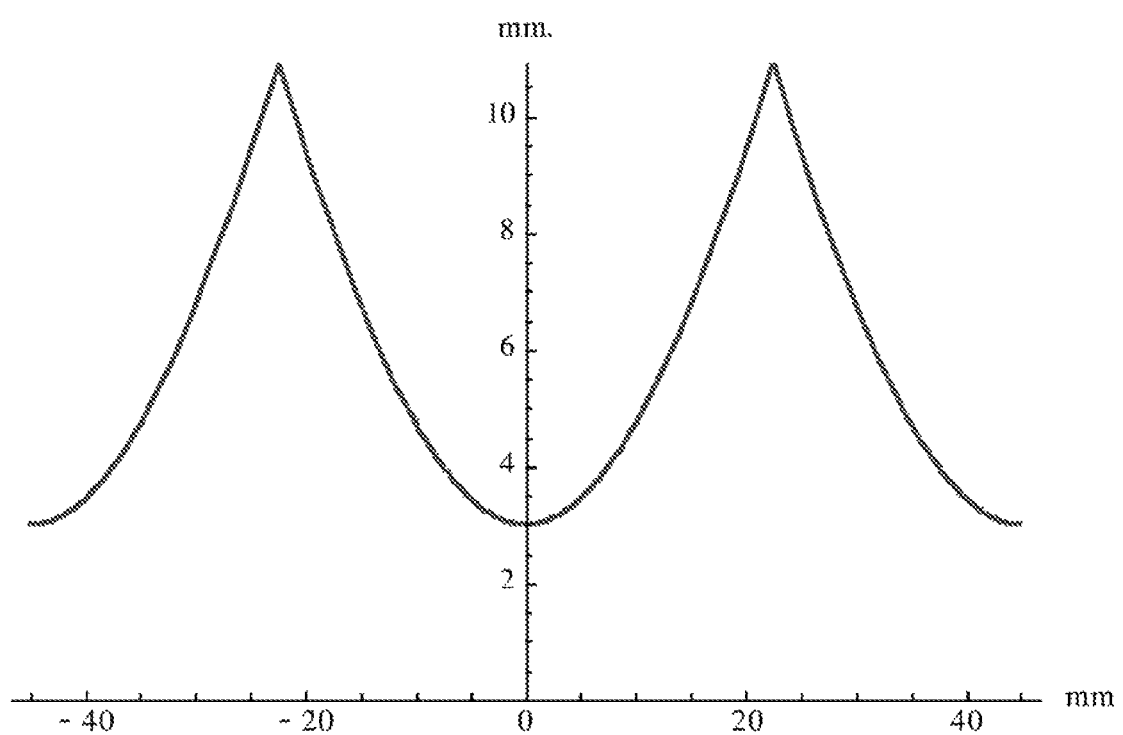
FIG. 17 is a plot of the rod-rod gap with respect to the closest stator rod, as a function of transverse displacement of a rotor rod

FIG. 17 is a plot of the gap vs lateral displacement for the rod-rod system analyzed above. It illustrates the monotonically increasing gap for this electrode geometry referred to herein.

Optimizing Generator Power Output by Sizing the Shunt Inductor

Figure 18:
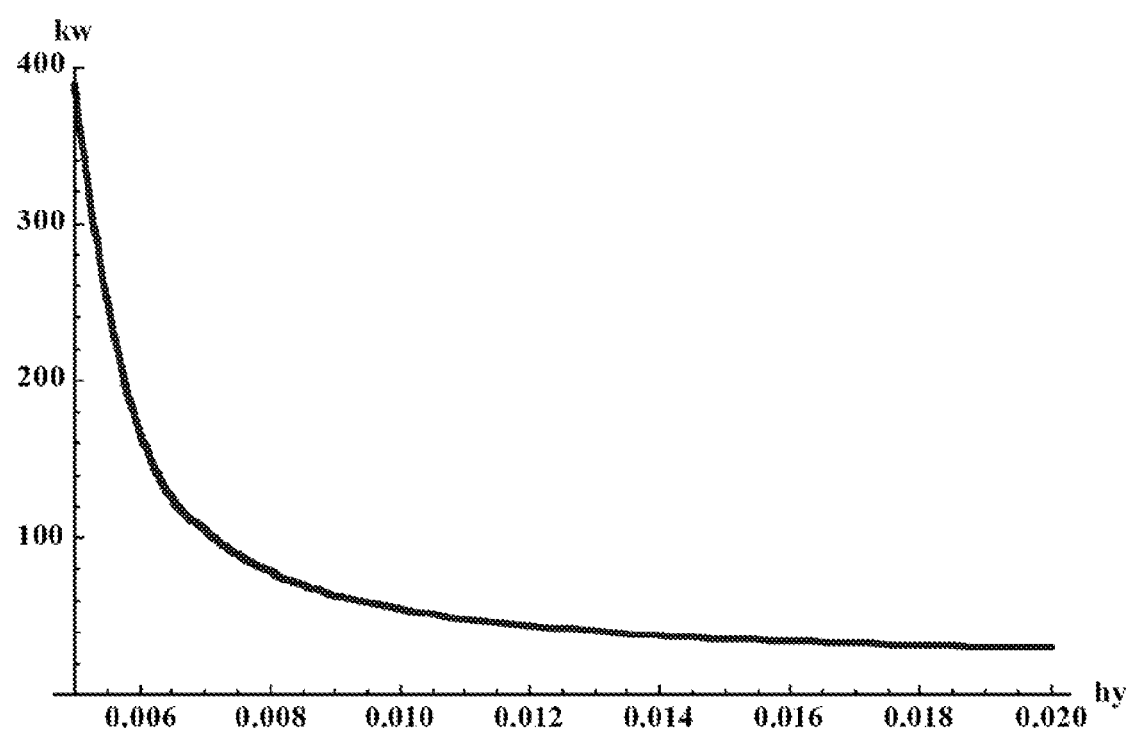
FIG. 18 is a plot of E-S generator output vs the value of the shunting inductance, for a generator attached to a EMB rotor storing 100 kwh.

As has been mentioned above, by sizing the shunting inductor condensers it is possible to shift the phase of the generated pulse such that it occurs at a larger gap and at a region of larger negative derivative of the capacity, both of which lead to substantially higher power output for the same voltage limit at minimum gap. This enhancement effect is illustrated in FIG. 18, which is a plot of the predicted power output of a 100 kwh EMB as a function of the size of the shunting inductor, holding the load resistor and rpm constant.

As can be seen from the plot, as the size of shunting inductor is reduced the power output increases, even though the output voltage at maximum capacity (i.e., at the minimum gap) is maintained at 50 kV. Note that the power increase over that obtained without the shunting inductor can be more than an order of magnitude. The origin of this increase, as has been mentioned, is the shift in phase and magnitude of the peak potential caused by the addition of the shunting inductance. Specifically, the phase shift causes the peak voltage location in time to be nearer to the location of the maximum time derivative of the capacitor variation, and at the same time the magnitude of the peak voltage is itself increased. In the plot of FIG. 18, the power approaches 400 kw. However at the indicated value of the shunt inductance, 0.005 hy, the peak voltage has increased to 508 kV (assuming a limit of 50 kV at the minimum gap). Thus to operate at this value of shunting inductance would require dropping the charging voltage (and thus reducing both the minimum-gap voltage and the peak voltage) to a value where breakdown would not occur at the time of voltage maximum.

Lowering the shunt inductance causes the phase where the maximum voltage occurs to move to lower values relative to the point of minimum gap, the gap at which the maximum voltage occurs. As a result, this reduction in value of the shunt inductance increases the voltage breakdown value. The phase-shift-induced changes in the charging voltage and the peak voltage can be deduced from the code calculations.

Figure 19:
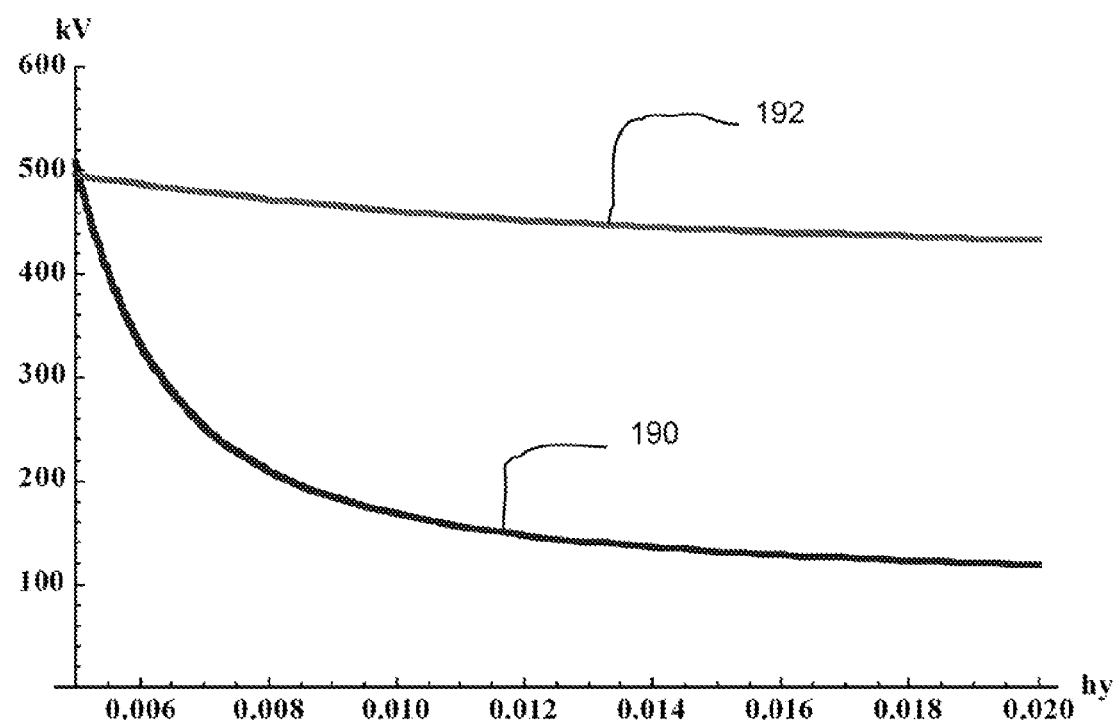
FIG. 19 shows plots of the projected breakdown voltage and the calculated peak voltage across the generator capacitors as a function of the inductance of the shunt inductor. The minimum gap potential is constrained to be 50 kV in calculating the peak voltage.

As noted above the increase in power output associated with the introduction of the shunt inductance results from shifting the phase at which the peak voltage occurs closer to the region of maximum negative rate of change of capacity and from an increase in the peak voltage itself. In the example given here, except at the lowest value of the shunt inductance these higher peak voltages are still substantially less than the extrapolated experimental breakdown voltages shown in FIG. 3. FIG. 19 illustrates this comparison. Curve 190 of is a plot of the calculated peak voltages as a function of the shunt inductance, and curve 192 is a plot of the projected breakdown voltages. As before these curves depict the results obtained by the code when the voltage across the generator capacitors is limited to 50 kV at the time of minimum gap (maximum capacity). At the lowest value of the shunt inductor the peak voltage approaches the projected breakdown voltage shown in FIG. 3. In this case it would therefore be necessary to reduce the charging voltage, and with it the minimum-gap voltage of 50 kV, in order to avoid breakdown.

The Load Resistance

In all of the calculations and optimizations presented in the previous sections it has been assumed the load on the generator is a pure resistance with the value of 650 Ohms. This assumption has been made to simplify the discussion, but the load resistance parameter is also one that needs to be optimized to achieve the highest power. In addition, the assumption of a purely ohmic load resistance is unrealistic in that it is likely that in a practical situation the impedance of the load will include an inductive component. In this section we will therefore examine this effect, as follows: Keeping the resistive component of the load impedance constant at 650 Ohms we will add in an inductive reactance. As will be shown, contrary to the effect observed in the previous embodiment, a small added inductance in the load will have the effect of increasing power transferred and thus provides another parameter that can be optimized for a given situation.

Figure 20:
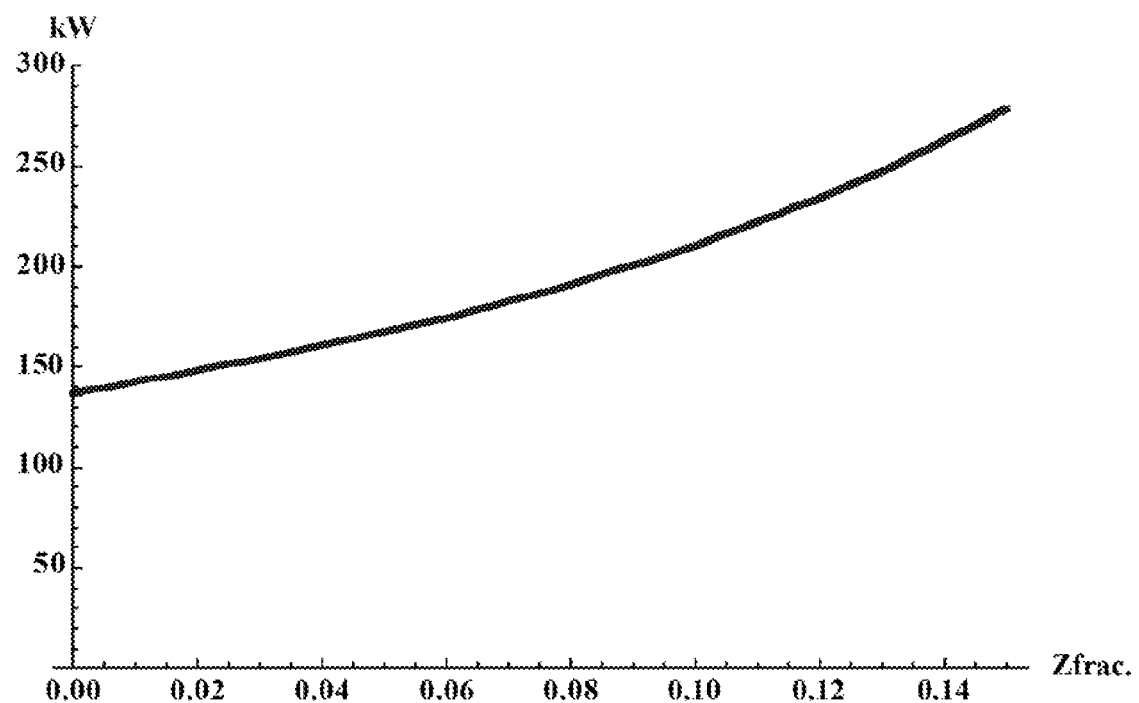
FIG. 20 shows power output as a function of the fraction of the series inductive impedance of the load resistance

FIG. 20 shows the effect of adding a series inductive impedance, expressed as a fraction of the load resistance of 650 Ohms, on the power output. The observed increase can again be traced to a favorable shift in the phase of occurrence of the maximum voltage.

Figure 21:
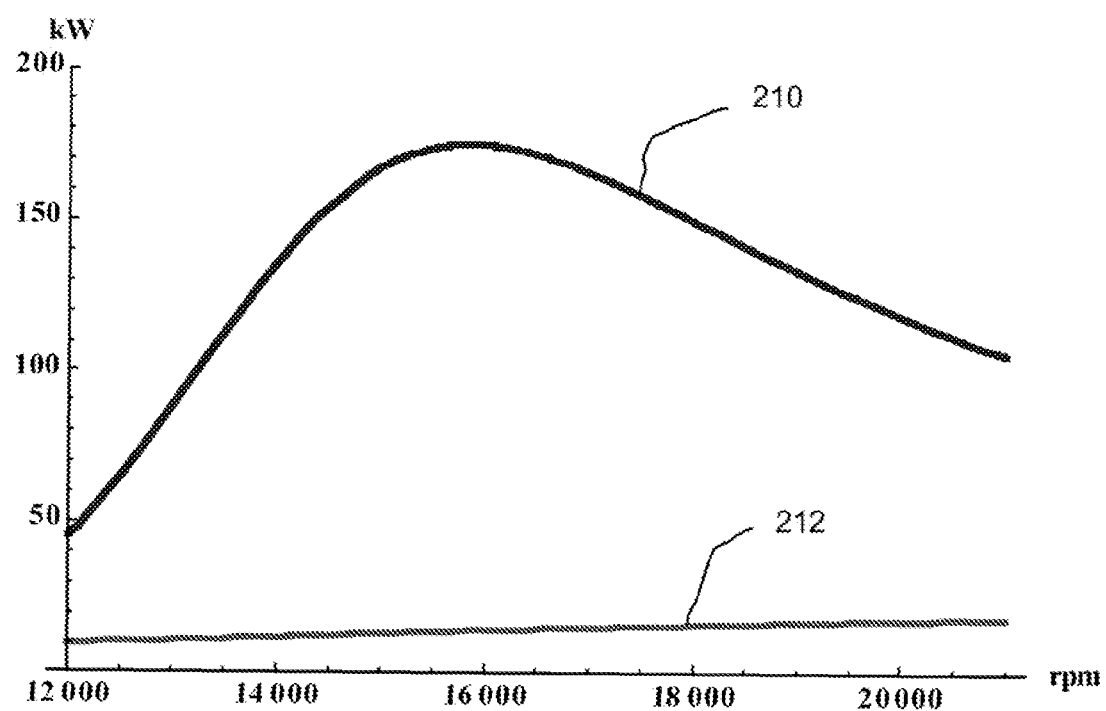
FIG. 21 shows power output as a function of rotor rpm for shunt inductor of 0.007 hy, and without shunt inductor.

Reduction of the Decay of Generator Output Caused by Slowing of the Rotor Speed During Discharge The output power of the electrostatic generator using conventional load circuit designs always decreases substantially as the rotor slows down during discharge. This decrease can be lessened by increasing the charging voltage, subject to the voltage breakdown limits of the generator capacitors. However the analysis of the new load circuit configuration has shown that the output power at constant minimum-gap voltage can remain more nearly constant with a reduction in rotor rpm (or it can even increase) when the new technique is employed. FIG. 21 below shows the result of calculating this effect. Curve 210 represents the output vs rpm for a shunting inductance of 0.007 hy; curve 212 shows the power output over the same range of rpm but with no shunting inductance. In both cases the charging voltage is adjusted so that the electrostatic generator capacitor voltage at minimum gap is 50 kV.

Note both the enhancement of output power caused by the shunt inductance and the region where the power actually increases with reduction in speed. In a given situation, by adjustment of the shunt inductance the output power could be made to remain approximately constant during a reduction in speed approaching a factor of two, while still maintaining the voltage at minimum gap at or below a fixed value (50 kV in the examples given).

Thus, a novel method of enhancing the power output and lowering the output voltage of an electrostatic generator has been described. The power enhancement is achieved by introducing a shunting inductance across the output terminals. The power enhancement arises from the twin effects of shifting the phase at which the maximum potential across the generator condensers occurs farther from the phase where the capacity is a maximum (minimum gap position) while at the same time that potential is increased. In practical examples the voltage maximum can still be substantially lower than the projected breakdown voltages for well conditioned stainless steel rods or tubes.

REFERENCES

[1] M. Rabinowitz and E. E. Donaldson, JAP 36, 1314 (1965)
[2] W. R. Smythe, "Static and Dynamic Electricity," McGraw-Hill (1939)

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A method, comprising:
providing a circuit including:
a source of positive dc voltage connected to a first inductor which is connected to a first variable capacitor (VC) which is connected to a second VC which is connected to a second inductor which is connected to a source of negative dc voltage, wherein said first VC and said second VC are synchronously monotonically variable between a maximum gap and a minimum gap, wherein said first inductor in series with said first VC forms a first series-resonant circuit, wherein said second inductor in series with said second VC forms a second series-resonant circuit, wherein each of said first series-resonant circuit and said second series-resonant circuit are configured to comprise a resonant frequency that varies over a band of frequencies that includes the operating frequency of said first VC and said second VC;
a first coupling capacitor (CC) connected to a node between said first inductor and said first VC;
a second CC connected to a node between said second inductor and said second VC; and
a load connected between said first CC and said second CC;
determining a target voltage at said minimum gap, wherein said target voltage is a specific voltage that is less than the breakdown voltage at said minimum gap; and
simultaneously maintaining said target voltage at said minimum gap while synchronously adjusting the value of said first CC and said second CC to move the peak phase of the generated voltage to a new position to produce an increased allowable voltage due to an increased breakdown voltage at said new position relative to the allowable voltage at said new position prior to the step of adjusting the value of said first CC and said second CC.

2. The method of claim 1, further comprising simultaneously maintaining said target voltage while synchronously adjusting the value of said first CC and said second CC to move the peak phase of the generated voltage to a second new position to maximize the power to said load.

3. The method of claim 1, wherein said a target voltage is equal to said breakdown voltage reduced by a defined amount.

4. The method of claim 3, wherein said defined amount is a predetermined safety factor.

5. The method of claim 1, wherein if said generated voltage at said new position exceeds the breakdown voltage reduced by said defined amount at said new position, the method further comprises synchronously adjusting the value of said first CC and said second CC until said generated voltage at said new position is no more than the breakdown voltage at said new position reduced by said defined amount.

6. The method of claim 2, further comprising varying the load resistor value and repeating the step of simultaneously maintaining said target voltage while synchronously adjusting the value of said first CC and said second CC to increase the generated power.

7. The method of claim 2, further comprising varying the load resistor value and repeating the step of simultaneously maintaining said target voltage while synchronously adjusting the value of said first CC and said second CC to maximize the generated power.

8. The method of claim 1, further comprising synchronously varying the values of said first inductor and said second inductor as said operating frequency changes such that said resonant frequency continues to vary across said operating frequency.

9. The method of claim 1, wherein said first VC is formed by the rotor and a first stator of an electrostatic generator (ESG), wherein said second VC is formed by said rotor and a second stator of said ESG, wherein said rotor and said stator comprises elements selected from the group consisting of rods, tubes and corrugations.

10. An apparatus, comprising:
providing a circuit including:
a circuit comprising in series a first inductor, a first variable capacitor (VC), a second VC and a second inductor, wherein said first VC and said second VC are each monotonically variable between a maximum gap and a minimum gap, wherein said first inductor and said first VC form a first series-resonant circuit, wherein said second inductor and said second VC form a second series-resonant circuit, wherein each of said first series-resonant circuit and said second series-resonant circuit are configured to each comprise a resonant frequency that varies over a band of frequencies that includes the operating frequency of said first VC and said second VC;
a first coupling capacitor (CC) connected to a node between said first inductor and said first VC;
a second CC connected to a node between said second inductor and said second VC; and
a load connected between said first CC and said second CC, wherein the values of said first CC and said second CC are selected such that the peak phase of a voltage generated by said first VC and said second VC occurs at a larger gap position than at larger values of said first CC and said second CC.

11. The apparatus of claim 10, further comprising means for simultaneously maintaining a target voltage while synchronously adjusting the value of said first CC and said second CC to move the peak phase of the generated voltage to a second new position to maximize the power to said load, wherein said target voltage is a specific voltage that is less than the breakdown voltage at said minimum gap.

12. The apparatus of claim 10, wherein said a target voltage is equal to said breakdown voltage reduced by a defined amount.

13. The apparatus of claim 12, wherein said defined amount is a predetermined safety factor.

14. The apparatus of claim 10, wherein if said generated voltage at said new position exceeds the breakdown voltage reduced by said defined amount at said new position, said first CC and said second CC each comprise a value such that said generated voltage at said new position is no more than the breakdown voltage at said new position reduced by said defined amount.

15. The apparatus of claim 10, wherein the values of said first CC, said second CC and the resistance of said load are selected in combination to increase the generated power such that said power is greater than when not selected in combination.

16. The apparatus of claim 10, wherein the values of said first CC, said second CC and the resistance of said load are selected in combination to maximize the generated power such that said power is greater than when not selected in combination.

17. The apparatus of claim 10, wherein the inductance of each of said first inductor and said second inductor is variable such that as said operating frequency changes their respective resonant frequency can vary across said operating frequency.

18. The apparatus of claim 10, wherein said first VC is formed by the rotor and a first stator of an electrostatic generator (ESG), wherein said second VC is formed by said rotor and a second stator of said ESG, wherein each of said rotor, said first stator and said second stator comprises electrodes selected from the group consisting of rods, tubes and corrugations.

19. A method, comprising:
providing a circuit including:
a first dc voltage source having its positive terminal connected to a first inductor which is connected to a first variable capacitor (VC) which is connected to a second VC which is connected to a second inductor which is connected to the negative terminal of a second dc voltage source, wherein said first VC and said second VC are synchronously monotonically variable between a maximum gap and a minimum gap, wherein said first inductor in series with said first VC forms a first series-resonant circuit, wherein said second inductor in series with said second VC forms a second series-resonant circuit, wherein each of said first series-resonant circuit and said second series-resonant circuit are configured to comprise a resonant frequency that varies over a band of frequencies that includes the operating frequency of said first VC and said second VC;
a first load connected to the negative terminal of said first dc voltage source, wherein the other terminal of said first load is connected to ground;
a first shunt inductor in parallel with said first load;
a second load connected to the positive terminal of said second dc voltage source, wherein the other terminal of said second load is further connected to ground;
a second shunt inductor in parallel with said second load;
determining a target voltage at said minimum gap, wherein said target voltage is a specific voltage that is less than the breakdown voltage at said minimum gap; and
simultaneously maintaining said target voltage while synchronously adjusting the value of said first shunt inductor and said second shunt inductor to move the peak phase of the generated voltage to a new position to produce an increased allowable voltage due to an increased breakdown voltage at said new position relative to the allowable voltage at said new position prior to the step of adjusting the value of said first CC and said second CC.

20. The method of claim 19, further comprising simultaneously maintaining said target voltage while synchronously adjusting the value of said first shunt inductor and said second shunt inductor to move the peak phase of the generated voltage to a second new position to maximize the power to said load.

21. The method of claim 19, wherein said a target voltage is equal to said breakdown voltage reduced by a defined amount.

22. The method of claim 21, wherein said defined amount is a predetermined safety factor.

23. The method of claim 19, wherein if said generated voltage at said new position exceeds the breakdown voltage reduced by said defined amount at said new position, the method further comprises reducing the charging voltage at said minimum gap such that said generated voltage at said new position is no more than the breakdown voltage at said new position reduced by said defined amount.

24. The method of claim 20, further comprising varying the load resistor value and repeating the step of simultaneously maintaining said target voltage while synchronously adjusting the value of said first shunt inductor and said second shunt inductor to increase the generated power.

25. The method of claim 20, further comprising varying the load resistor value and repeating the step of simultaneously maintaining said target voltage while synchronously adjusting the value of said first shunt inductor and said second shunt inductor to maximize the generated power.

26. The method of claim 19, further comprising synchronously varying the values of said first shunt inductor and said second shunt inductor as said operating frequency changes such that said resonant frequency continues to vary across said operating frequency.

27. The method of claim 19, wherein said first VC is formed by the rotor and a first stator of an electrostatic generator (ESG), wherein said second VC is formed by said rotor and a second stator of said ESG, wherein said rotor and said stator comprises elements selected from the group consisting of rods, tubes and corrugations.

28. An apparatus, comprising:
providing a circuit including:
a first dc voltage source having its positive terminal connected to a first inductor which is connected to a first variable capacitor (VC) which is connected to a second VC which is connected to a second inductor which is connected to the negative terminal of a second dc voltage source, wherein said first VC and said second VC are synchronously monotonically variable between a maximum gap and a minimum gap, wherein said first inductor in series with said first VC forms a first series-resonant circuit, wherein said second inductor in series with said second VC forms a second series-resonant circuit, wherein each of said first series-resonant circuit and said second series-resonant circuit are configured to comprise a resonant frequency that varies over a band of frequencies that includes the operating frequency of said first VC and said second VC;
a first load connected to the negative terminal of said first dc voltage source, wherein the other terminal of said first load is connected to ground;
a first shunt inductor in parallel with said first load;
a second load connected to the positive terminal of said second dc voltage source, wherein the other terminal of said second load is further connected to ground; and
a second shunt inductor in parallel with said second load;
wherein the values of said first shunt inductor and said second shunt inductor are selected such that the peak phase of a voltage generated by said first VC and said second VC occurs at a larger gap position than at larger values of said first shunt inductor and said second shunt inductor.

29. The method of claim 28, further comprising means for simultaneously maintaining a target voltage while synchronously adjusting the value of said first shunt inductor and said second shunt inductor to move the peak phase of the generated voltage to a second new position to maximize the power to said load, wherein said target voltage is a specific voltage that is less than the breakdown voltage at said minimum gap.

30. The method of claim 28, wherein said a target voltage is equal to said breakdown voltage reduced by a defined amount.

31. The method of claim 30, wherein said defined amount is a predetermined safety factor.

32. The method of claim 28, wherein if said generated voltage at said new position exceeds the breakdown voltage reduced by said defined amount at said new position, setting said generated voltage at said new position to be no more than the breakdown voltage at said new position reduced by said defined amount.

33. The apparatus of claim 28, wherein the values of said first shunt inductor, said second shunt inductor and the resistance of said load are selected in combination to increase the generated power such that said power is greater than when not selected in combination.

34. The apparatus of claim 28, wherein the values of said first shunt inductor, said second shunt inductor and the resistance of said load are selected in combination to maximize the generated power such that said power is greater than when not selected in combination.

35. The apparatus of claim 28, wherein the inductance of each of said first shunt inductor and said second shunt inductor is variable such that as said operating frequency changes their respective resonant frequency can vary across said operating frequency.

36. The apparatus of claim 28, wherein said first VC is formed by the rotor and a first stator of an electrostatic generator (ESG), wherein said second VC is formed by said rotor and a second stator of said ESG, wherein each of said rotor, said first stator and said second stator comprises electrodes selected from the group consisting of rods, tubes and corrugations.

* * * * *